United States Patent
Carr et al.

[11] Patent Number: 6,081,511
[45] Date of Patent: Jun. 27, 2000

[54] LOAD SHARING FOR REDUNDANT NETWORKS

[75] Inventors: Dorion W. Carr, Amherst; William A. Edmondson, Merrimack; Brendan J. Fee, Nashua, all of N.H.

[73] Assignee: Cabletron Systems, Inc., Rochester, N.H.

[21] Appl. No.: 08/689,784

[22] Filed: Aug. 14, 1996

[51] Int. Cl.[7] .............................. H04L 12/28; H04L 12/56
[52] U.S. Cl. ...................... 370/256; 370/401; 370/468; 370/228
[58] Field of Search .................................. 370/254, 255, 370/256, 257, 258, 401, 402, 403, 404, 406, 407, 227, 228, 237, 235, 400, 468

[56] References Cited

U.S. PATENT DOCUMENTS

| | | | |
|---|---|---|---|
| 4,811,337 | 3/1989 | Hart | 370/256 |
| 5,018,137 | 5/1991 | Backes et al. | 370/401 |
| 5,088,090 | 2/1992 | Yacoby | 370/402 |
| 5,150,360 | 9/1992 | Perlman et al. | 370/402 |
| 5,189,662 | 2/1993 | Kleine-Altekamp | 370/227 |
| 5,214,646 | 5/1993 | Yacoby | 370/402 |
| 5,241,534 | 8/1993 | Omuro et al. | 370/218 |
| 5,425,019 | 6/1995 | Chugo et al. | 370/237 |

FOREIGN PATENT DOCUMENTS

0324277A2 7/1989 European Pat. Off. .

OTHER PUBLICATIONS

Ram Krishnan et al., "Choice of Allocation Granularity In Multipath Source Routing Schemes," Networking: Foundation For The Future, San Francisco, Mar. 28–Apr. 1, 1993, vol. 1, Mar. 28, 1993, Insitute of Electrical and Electronics Engineers, pp. 322–329.

Kolman et al., "Discrete Mathematical Structures For Computer Science, Second Edition," Chapter 2, Relations and Diagraphs, pp. 96–115 (1984).

Perlman, "Interconnections Bridges and Routers," Chapter 3, Transparent Bridges, pp. 43–97 (1992).

*Primary Examiner*—Chau Nguyen
*Assistant Examiner*—Soon-Dong Hyun
*Attorney, Agent, or Firm*—Wolf, Greenfield & Sacks, P.C.

[57] ABSTRACT

Method and apparatus providing for load sharing in redundant communication networks. The method and apparatus may include detection of redundant communication links in the network topology and sharing communication load over those links. This may be accomplished through assignment of unique labels to each link in a group of redundant links and assignment to each data packet of a value corresponding to the label on just one of the links; the packet being forwarded on only that link. The method and apparatus are also suited to quick recovery from a change in state of a network topology.

23 Claims, 19 Drawing Sheets

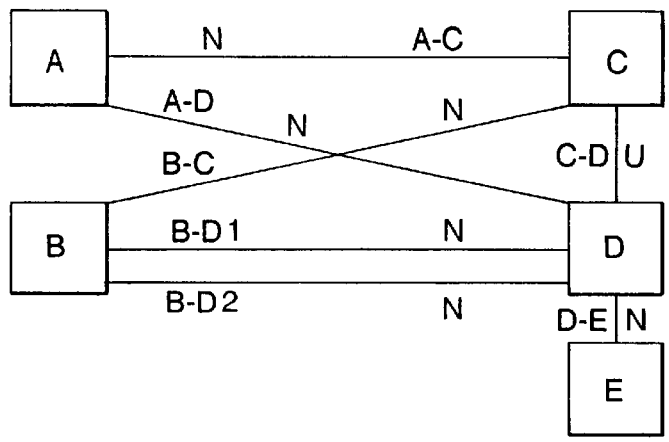
FIG. 11A
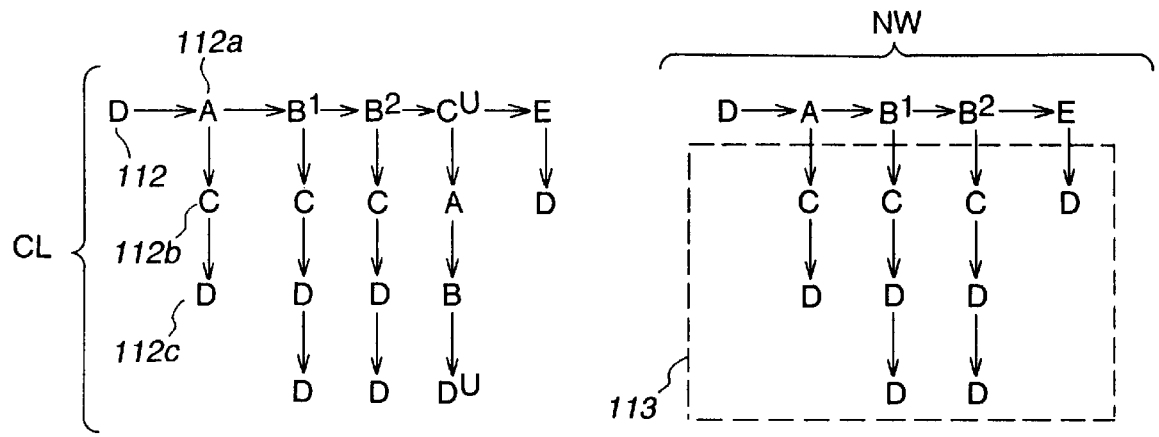
FIG. 11B
FIG. 11C
FIG. 11D
FIG. 11E

LOAD SHARING FOR REDUNDANT NETWORKS

FIELD OF THE INVENTION

This invention relates to communication networks, and more particularly, to an apparatus and method for sharing the load among redundant links in a communication network.

BACKGROUND OF THE INVENTION

As businesses have realized the economic advantages of sharing expensive computer resources, cabling systems (including wireless cabling systems) have proliferated in order to enable the sharing of such resources over a computer network. A network for permitting this communication may be referred to as a local area network or "LAN." LAN refers to an interconnection data network that is usually confined to a moderately sized geographical area, such as a single office building or a campus area. Larger networks are often referred to as wide area networks or "WANs."

Networks may be formed using a variety of different interconnection elements, such as unshielded twisted pair cables, shielded twisted pair cables, coaxial cable, fiber optic cable or even wireless interconnect elements. The configuration of these cabling elements, and the interfaces for the communication medium, may follow one (or more) of many topologies, such as star, ring or bus. In addition, a number of different protocols for accessing the networking medium have evolved. For example, the Institute of Electrical and Electronics Engineers, IEEE. has developed a number of standards for networks, including IEEE 802.3 relating to Ethernet buses using carrier sense multiple access and collision detection, IEEE 802.4 relating to token buses using token passing and IEEE 802.5 relating to token ring networks using token passing. The ANSI has also developed a standard for fiber distributed data interface (FDDI) using multiple token passing.

As demand has grown, networks have gotten bigger and bigger. Eventually, the number of stations on a network use up the available bandwidth for that network, or approach the limits imposed by the physical medium used. Accordingly, methods for connecting two separate networks have developed. One such method involves the use of a bridge.

Generally, "bridge" refers to a link between (at least) two networks. Thus, when a bridge receives information on one network, it may forward that information to the second network. In this fashion, two separate networks can be made to function as one larger network.

Bridges can be used for a variety of purposes. They can be used to extend a network beyond the physical limitations of individual networks. They can be used to allocate bandwidth on individual networks, in order to isolate traffic within individual networks and thereby increase total available bandwidth. Bridges can also be used to isolate networks for security purposes.

FIG. 1 illustrates one example of networks being interconnected. A first network is shown at the cloud NW1. In the figure, a first end station, ES1, is located within the network cloud NW1. A second network cloud, NW2, is also shown and a second end station, ES2, is located within that network NW2. Similarly, a third network, NW3, is illustrated on which a third end station, ES3, is located.

The three networks, NW1, NW2, NW3, are interconnected by bridging boards A, B and C. Bridging board A includes four ports, A0, A1, A2 and A3. Bridging board B includes three ports, B0, B1 and B2. Bridging board C includes two ports, C0 and C1. Each port has an associated communication channel or "link." For example, port A1 has a communication channel A-B1 with port B0 of bridging board B.

A bridge is a communication path between two networks. Thus, the communication links A-NW1, A-B1, and B-NW2, which pass through board A at ports A0 and A1 and board B at ports B0 and B2, define a bridge between NW1 and NW2. For brevity, however, the link A-B1 is sometimes referred to as the bridge.

Bridges are well known in the art, and are the subject of a standard promulgated by the IEEE, IEEE 802.1, concerning transparent or self-learning bridges. A useful background discussion of bridges can be found in Radia Perlman, *Interconnections: Bridges and Routers*, Addison Wellesley Professional Computing Series, Reading, Mass. 1992. To aid in understanding the present invention, a discussion of transparent bridges follows. This discussion is not intended to limit the scope or application of the present invention and claims.

In one possible strategy, for connecting two networks with a bridging board, would be for the bridging board to forward all communications (referred to herein as "packets" or "data packets;" both these terms are intended to include traditional data packets and any functional equivalent, whether referred to in the art as "cells," "datagrams," or the like) to all other networks connected to that board. For example, whenever a communication is received from end station ES1, that communication would be forwarded to both network NW2 and network NW3, regardless of who the recipient is intended to be. In this fashion, the bridge would serve to combine the networks as though they were truly only one network. Unfortunately, the duplication of every message sent on a network would quickly clog up the available bandwidth on each of the networks.

To address this problem, it would be possible to program each bridging board with the location of each station on each network. In this way, every communication could be routed to the appropriate network. While this is a viable option, it requires additional hardware at each bridging board as well as additional system overhead.

One alternative is to have each bridging board watch traffic across the board in order to learn the location of each end station, as communications are made over the network. In this fashion, bridges could be simply plugged in to networks and left on their own to learn the proper connections to be made. This type of bridge is often referred to as a "transparent" bridge or "self-learning" bridge.

FIG. 2A illustrates the flow of information when a packet of data is sent from end station ES1 to end station ES2. Each packet of information includes a unique identifier that indicates the source station and destination station for the packet. In this example, the source address would be a unique address (such as a media access control, or "MAC" address) for ES1 and the destination address is a unique identifier for ES2.

In the example of FIG. 2A, board A first receives the packet from network NW1 on port A0. From this packet, board A learns that end station ES1 is located off of port A0, by virtue of the fact that the source address received on port A0 corresponds to ES1. Board A may then store that information in a table. In some implementations, this table may be referred to as a BAF table, bridge ASIC filter table or bridge address filter table. Although referred to herein as a BAF table, this is not intended as limiting in any way. The table is used to look up the destination address of packets as they arrive and, if the location of the destination address is "known" to the table, to forward the packet only to the port corresponding to the known path to that destination. The details of implementation, and the manner in which the information is stored, may vary and are not material to the present invention.

In the example of FIG. 2A, the packet would indicate a destination address ("DA") corresponding to ES2. Referring to the BAF table for board A, ABAF, ES2 is an "unknown" connection, that is, this board does not know which port should be used to forward communications to ES2. Accordingly, board A forwards the packet to each of its ports, other than the port on which the packet was received. (For the moment, assume that the link A-B2 is not connected.) Thus, the packet is forwarded to bridging board B and bridging board C. As indicated in FIG. 2A, each of bridging board B and bridging board C updates a BAF table, BBAF and CBAF, associated with the bridging board and forwards the packet to its only other port. As a result, bridging board B forwards the packet onto network NW2, and the packet is eventually received by end station ES2.

FIG. 2B illustrates what happens when end station ES3 then sends a communication packet to end station ES1. The packet is first received by bridging board C, which updates its BAF table, CBAF, as indicated in FIG. 2B. The packet is then forwarded to bridging board A, via port C0. In this example, bridging board A checks the destination address for the packet (which corresponds to end station ES1) and finds that the connection to ES1 is a known connection. Accordingly, bridging board A forwards the packet only to port A0. Of course, bridging board A also updates its BAF table, ABAF, to reflect that bridging board A now knows that end station ES3 lies off of its port A3.

In many cases, it is desirable to add an extra connection between networks. In the example illustrated in FIG. 1, a link A-B2 could be added. This would form a communication path that is redundant with a communication path already illustrated (which passes through link A-B1). As explained below, however, this would lead to significant problems using the bridging scheme explained so far.

Referring again to FIG. 2A, where end station ES1 is sending a communication packet to end station ES3, the packet is first received by bridging board A on port A0. Since the destination address corresponding to end station ES3 is unknown to bridging board A's BAF table, ABAF, bridging board A would forward the packet to each of the other ports—ports A1, A2 and A3. When the packet is received at bridging board B via port B0, the packet again has a destination address unknown to bridging board B in its BAF table, BBAF. Accordingly, bridging board B would forward the packet to both of its other ports, B1 and B2. Similarly, when bridging board B receives the packet via port B1, it will also forward the packet to ports B2 and B0. As a result, the packet would be unduly multiplied and consume excessive bandwidth.

To address this problem, a spanning tree procedure was developed to ensure that no redundant links are present in the internetwork structure. A "spanning tree" may be defined as a set of connections in a network topology where there is exactly one path from every bridge (or "node" or "vertex") to every other node. Thus, in the network of FIG. 1, the spanning tree algorithm would ensure that either link A-B2 or link A-B1 is not configured into the network and that no packets are passed over that link. This is done, for example, by "blocking" port A2 oil bridging board A and port B1 on bridging board B (or, for brevity, "blocking" link A-B2).

Implementation of the spanning tree algorithm is well known in the art, and one embodiment is the subject of the IEEE standard 802.1D. A useful summary of the spanning tree algorithm is also presented in Perlman, supra.

Use of the spanning tree procedure, however, has several drawbacks. For example, the blocking of an available link translates to the loss of bandwidth. Thus, the blocking of link A-B2 in FIG. 1 would reduce the amount of information that could otherwise flow between network NW1 and network NW2 in a given period of time. In addition, the addition or loss of a link can result in a lengthy reconfiguration time, as the spanning tree algorithm attempts to construct a new spanning tree due to the change in status of existing links.

It is an object of one embodiment of the present invention, therefore, to provide an apparatus and method that would enable use of redundant links, without leading to proliferation and duplication of packets sent across redundant links.

SUMMARY OF THE INVENTION

In one embodiment of the present invention, a method of sharing communication load in a redundant communication network is provided. According to the method, at least one group of links in the network that form a redundant communication path are identified. The communication load among these links may then be shared.

According to another embodiment of the invention, a method is provided for forwarding a data packet received by a bridging board, the bridging board being located in a redundant network. According to the method, a port is selected for transmission of the packet. Ports having links that are redundant with a selected port are identified. The packet is transmitted to the selected port and not to ports identified as redundant.

According to another embodiment of the invention, a method is provided for forwarding a data packet received by a bridging board in a redundant network topology. According to the method, information about the topology of the network is sent and received. Under this embodiment, at least one port of the bridging board is identified that corresponds to a link in a first set of redundant links in the network topology. A label is assigned to each identified port. A forward value is assigned to a received data packet. The data packet is forwarded to each identified port, only if the label for that port corresponds to the forward value.

According to another embodiment of the invention, a method is provided for continuing communication in a network after the failure of a first link in the network. According to this method, a second link in the network, that is redundant with the first link, is identified prior to the failure of the first link. After the failure of the first link, the communication load on the second link is increased (from either zero load or an existing amount, to a greater amount).

According to another embodiment of the invention, a self-learning bridging board for a communication network is disclosed. The bridging board includes a plurality of communication ports, means for detecting a redundancy in the network topology, the redundancy including at least one link coupled to one of the ports of this bridging board, and means for selectively forwarding data packets having an unknown destination address to the port of the bridging board that corresponds to the detected redundancy.

BRIEF DESCRIPTION OF DRAWINGS

FIG. 11A illustrates a sample network topology that includes multiple redundant communication paths.

FIG. 11B illustrates a sample connection list data structure for the network topology of FIG. 11A.

FIG. 11C illustrates a sample network list data structure for the network topology of FIG. 11A.

FIG. 11D illustrates a sample order list data structure for the network topology of FIG. 11A.

FIG. 11E illustrates a sample vertex list data structure for the network topology of FIG. 11A.

DETAILED DESCRIPTION

Figure 3:
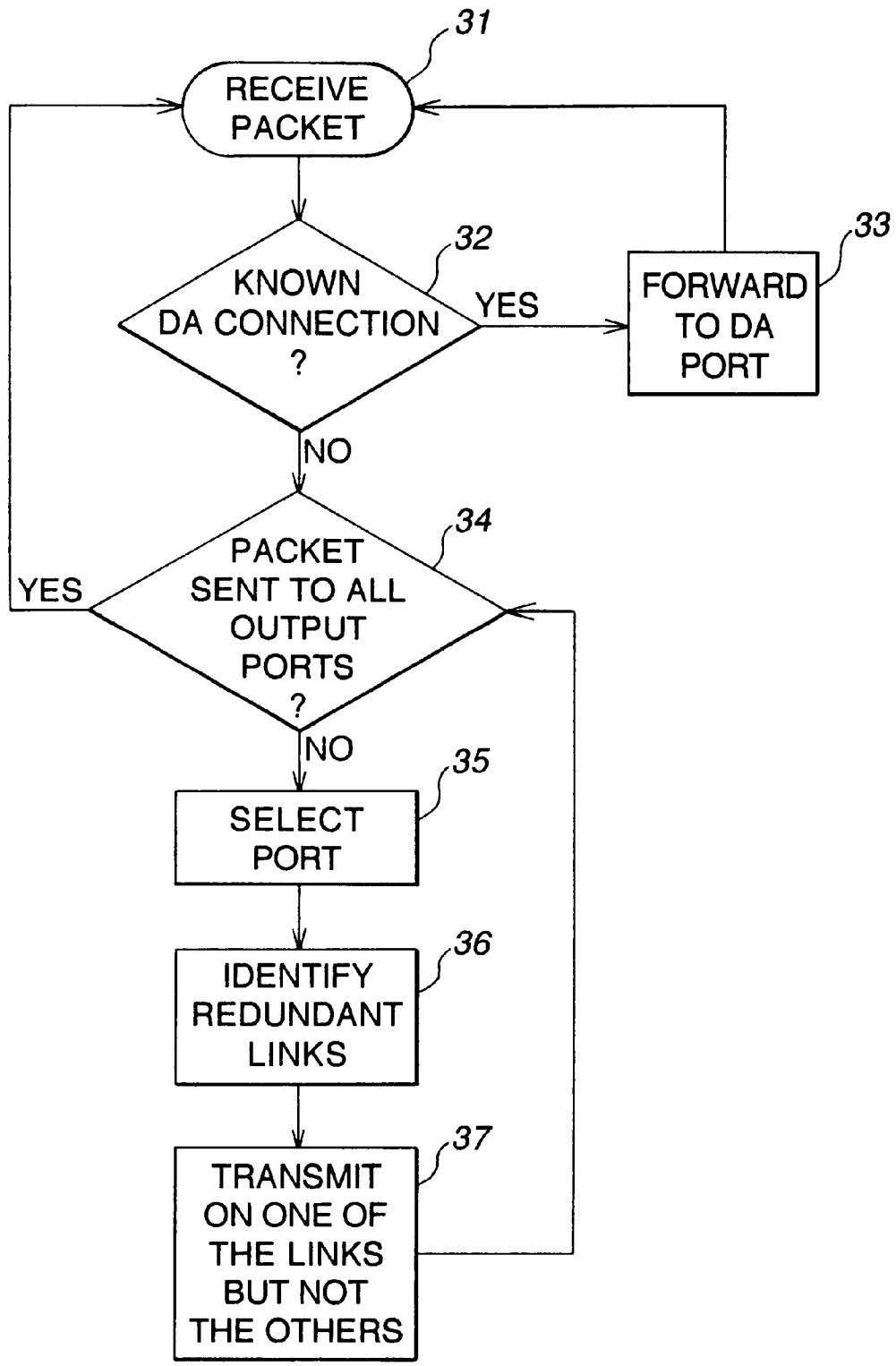
FIG. 3 illustrates one method according to the present invention of sharing communication load in a redundant communication network.

The present invention introduces the concept of load sharing for redundant links in a network. FIG. 3 illustrates the manner in which a bridging board would process packets according to one embodiment of the present invention.

Figure 1:
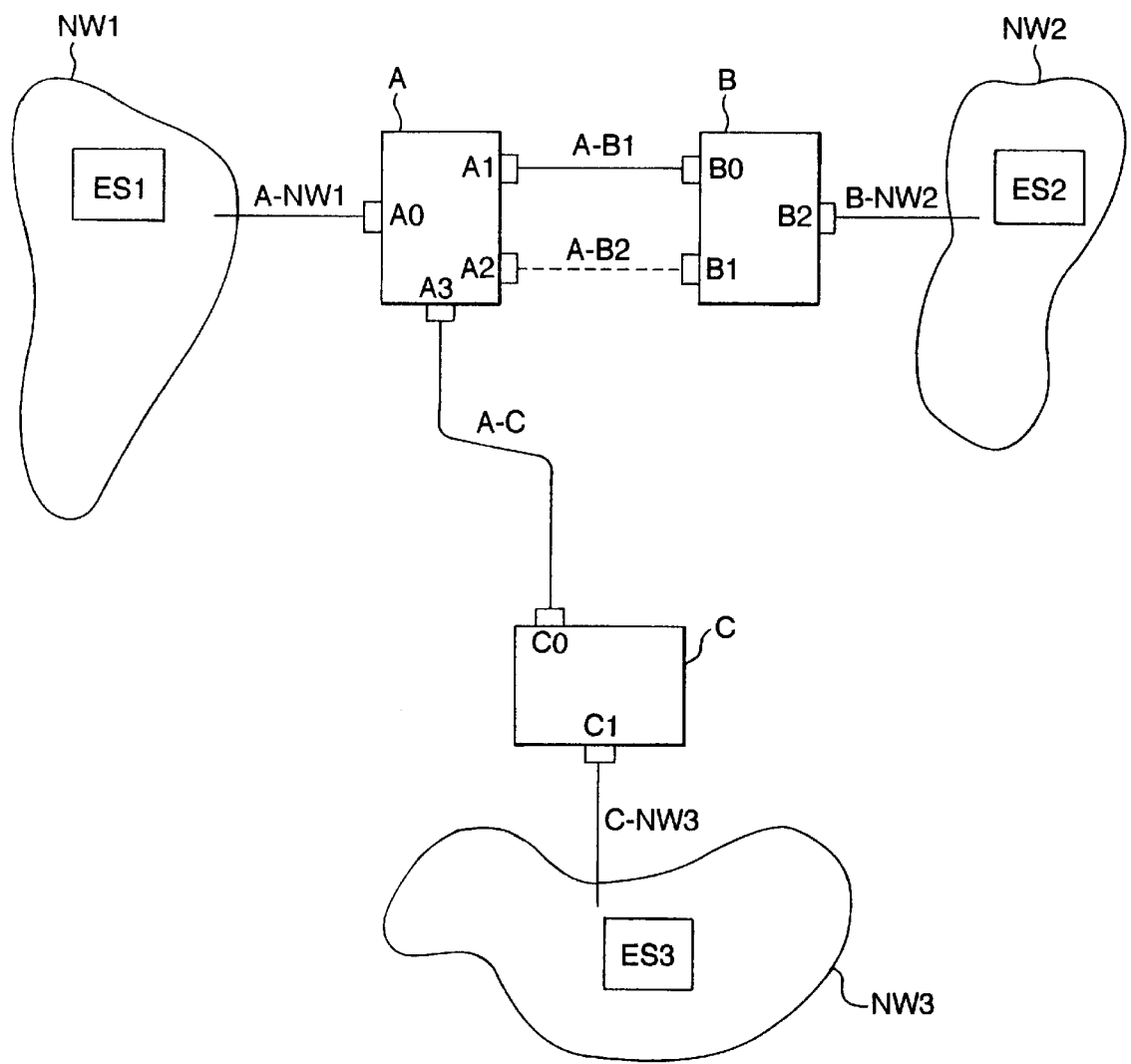
FIG. 1 illustrates an example of three interconnected networks.
Figure 2A:
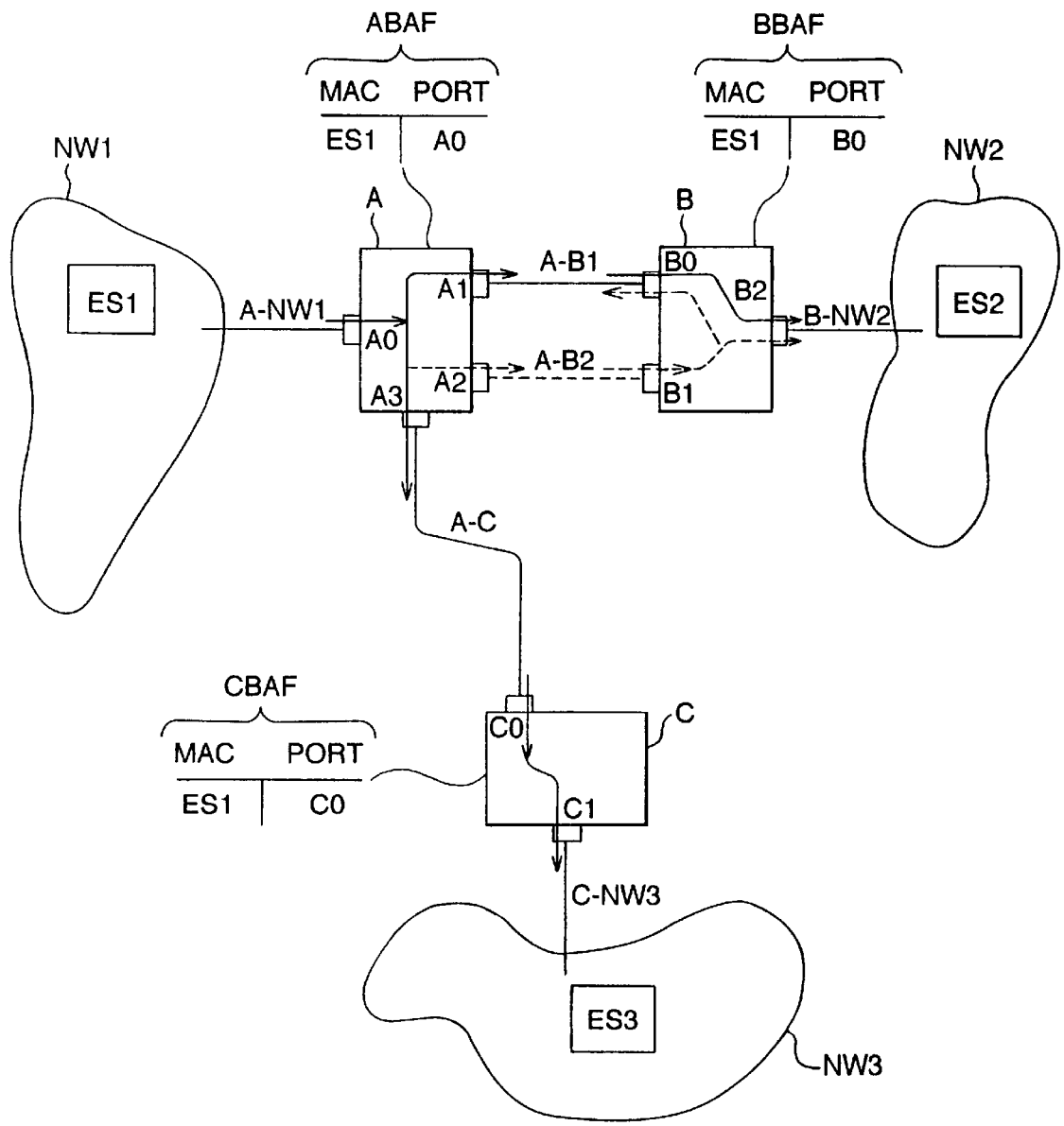
FIG. 2A illustrates a communication path for a data packet sent in the interconnected networks of FIG. 1.
Figure 2B:
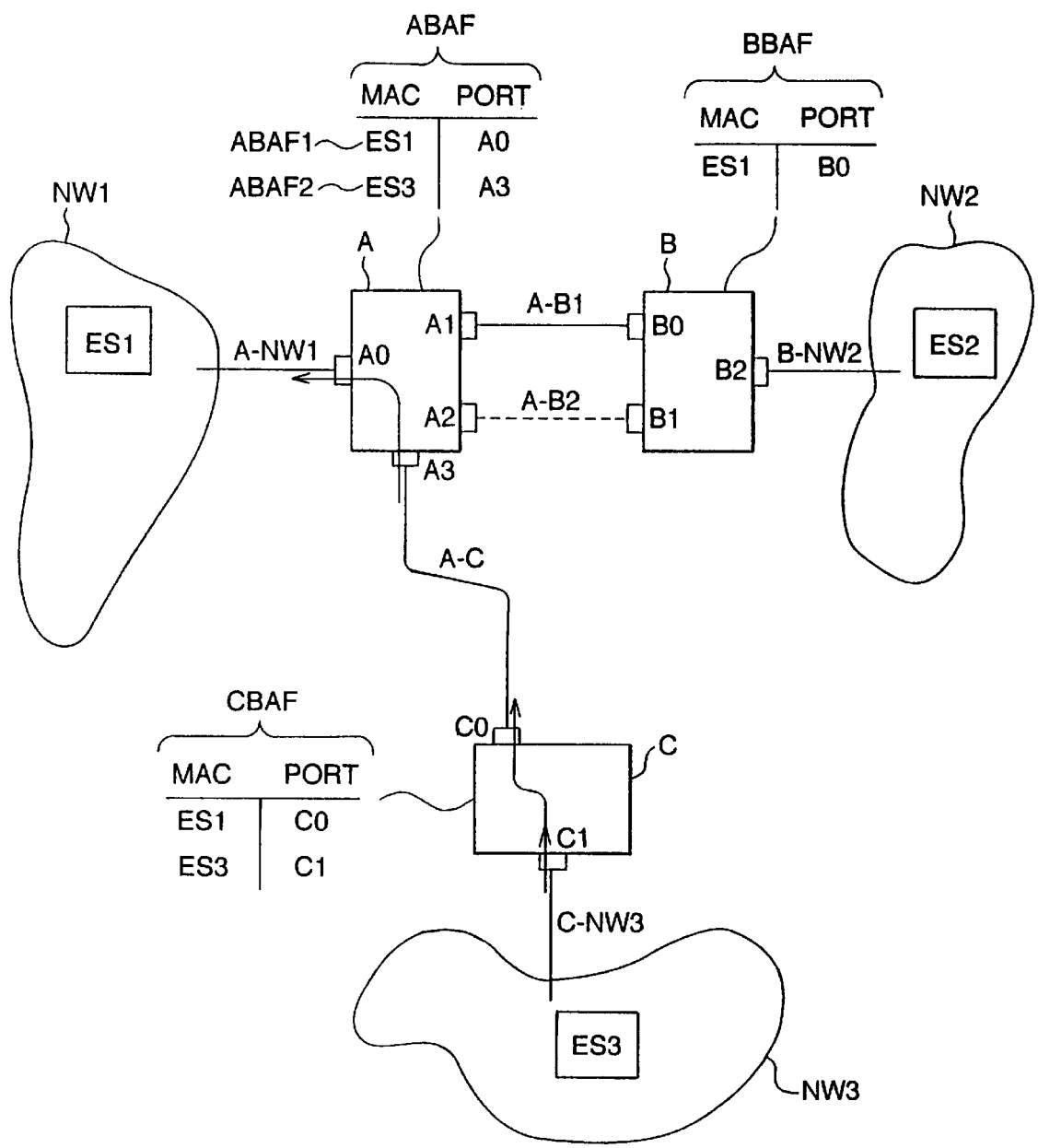
FIG. 2B illustrates a second example of a communication path for a data packet sent in the three interconnected networks of FIG. 1.

In FIG. 3, processing begins, at a step 31, when a bridging board receives a packet on a port. At a step 32, a determination is made as to whether the bridging board is aware of the correct forwarding port for the destination address of the packet; i.e., whether this packet is to a known connection. This may be done, as explained with reference to FIG. 2, by consulting a BAF table or by any other suitable means. If the proper forwarding port is known (i.e., a known destination address), the packet is forwarded to that port alone, as illustrated at a step 33. If the destination address is not known, the bridging board enters into a loop, 34 to 37, to send the packet to all of the applicable output ports.

The loop begins at a step 34 where it is determined whether the packet has been sent to all of the applicable output ports. If so, processing is complete for this packet and the bridging board waits to receive a new packet to process. If not, the bridging board may select a port at a step 35. At a step 36, the bridging board would then identify any redundant links for the given port. Once the redundant links have been identified, at a step 37, the bridging board will select only one of the redundant links on which to forward the packet.

Referring again to FIG. 2A and the example of end station ES1 sending a packet to end station ES3, and assuming that link A-B2 is a part of the network, bridging board A would receive a packet from end station ES1 being transmitted to end station ES3. Because end station ES3 is not a known destination address, bridging board A would enter loop steps 34 to 37. Because the packet was received on port A0, the packet will not be transmitted again on port A0. Bridging board A may then select port A1 at step 35. At step 36, bridging board A would determine that link A-B1 and link A-B2 are redundant links. Accordingly, bridging board A would transmit the packet on one of ports A1 and A2, but not the other, at step 37. Bridging, board A would further observe at step 34 that not all output ports have been covered. At step 35, bridging board A would select port A3. As there are no redundant links (step 36), bridging board A would forward the packet to port A3, at step 37.

To implement the method in FIG. 3, a mechanism must be provided to identify redundant links and for selecting one of the redundant links for a given data packet. This can be done, as shown in the method of FIG. 3, at the point in time when a packet is forwarded. An alternative is to resolve the identification of redundant links and manner of selecting a redundant link in advance of receiving and forwarding packets, which is the method of a preferred embodiment described in greater detail below.

In either case, however, identification of redundant links can become complicated for at least two reasons. First, the network topology (and, in particular, the interconnections among bridging boards) may be complex. Second, in a preferred embodiment, the bridges should be able to identify redundant links autonomously—that is, without the need for a centralized controller to coordinate bridging between networks.

Figure 4:
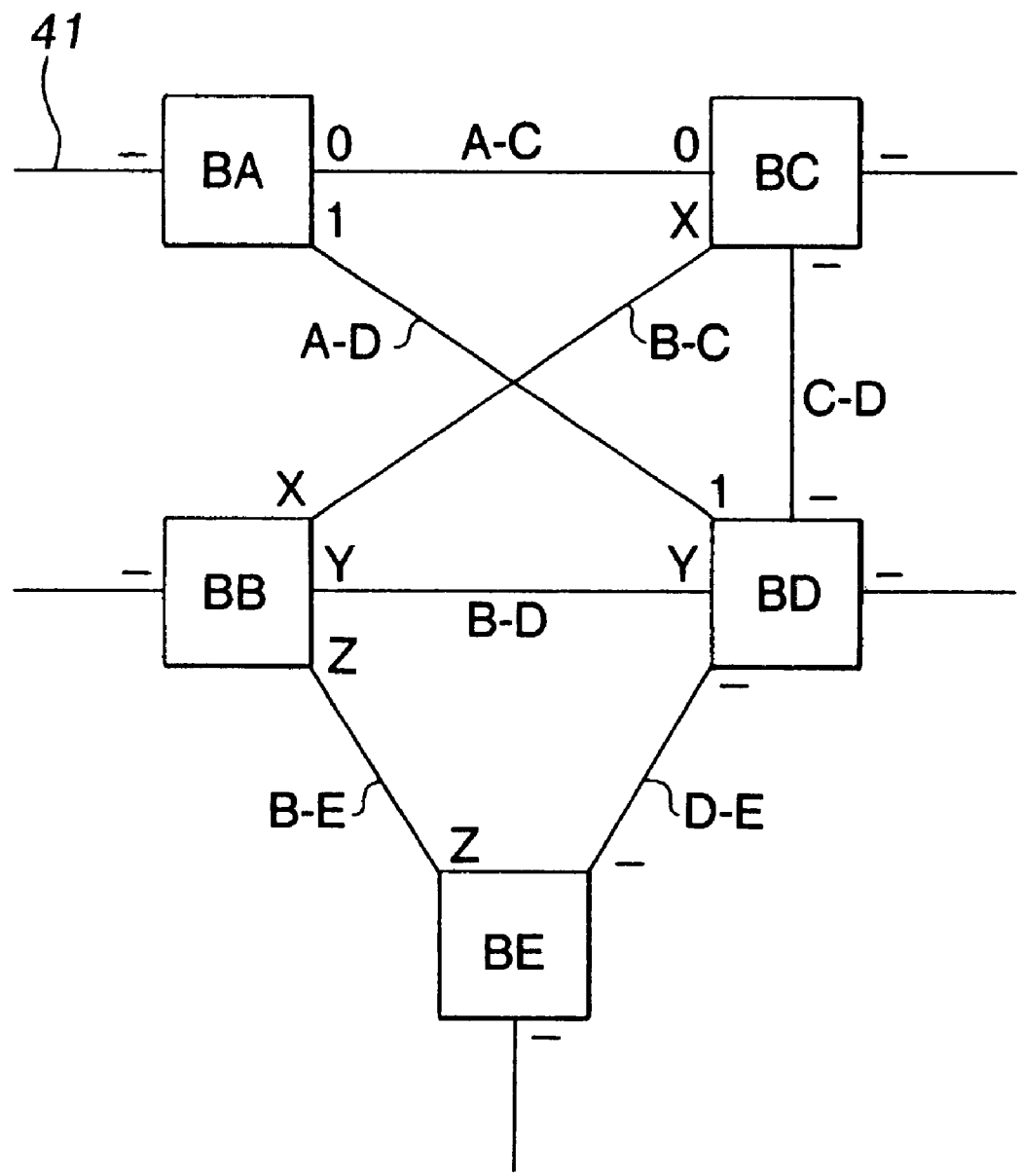
FIG. 4 illustrates a sample network topology that includes multiple redundant communication paths.

FIG. 4 provides one example of how selection of redundant links can become complicated. Consider a packet with an unknown destination address received at bridging board BA via the link 41. Because the destination address is unknown, this packet needs to be sent to each of bridging boards BB, BE, BD and BE. As can be readily observed, there are many possible combinations of links that a packet could traverse to reach bridging board BE. For example, the packet could traverse links A-C, C-D and B-E. Alternatively, the packet could traverse links A-D, B-D, and B-E. In sum, the selection of what link is redundant with another link may not be simple for every network topology.

The problem may be addressed using the concepts of load sharing sets or instances and forward masks. A load sharing set is a set of links that represent redundant paths within a network.

Figure 4A:
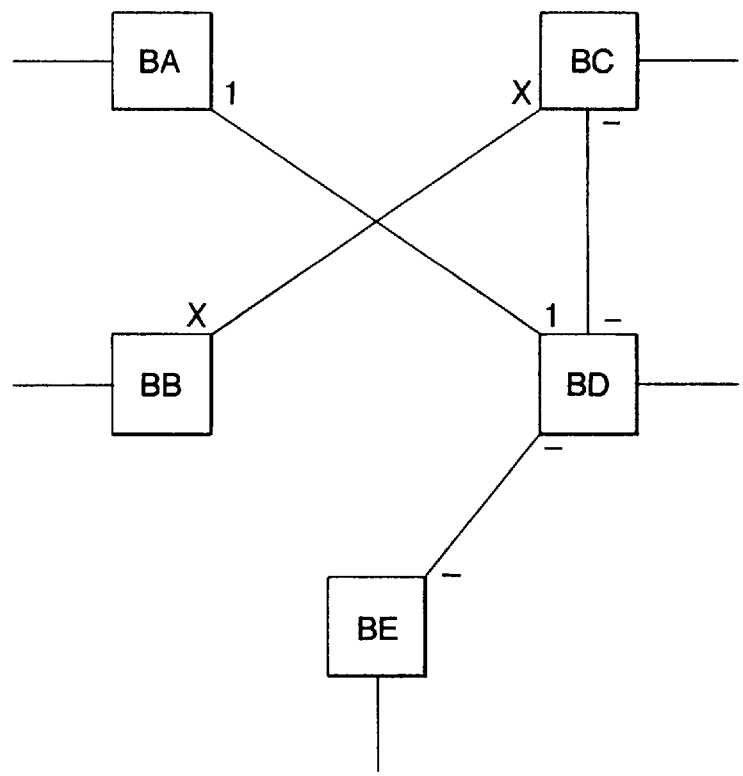
FIG. 4A illustrates an example of an effective network topology for a data packet sent in the network of FIG. 4.
Figure 4B:
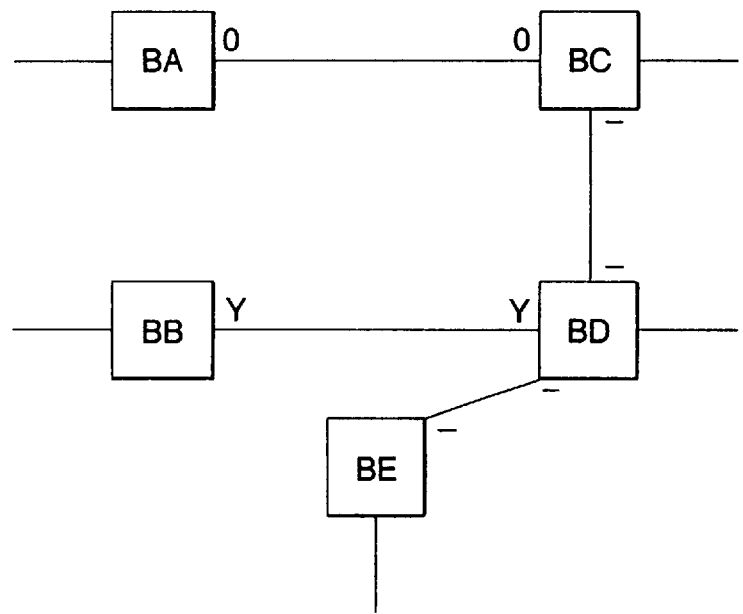
FIG. 4B illustrates a second example of an effective network topology for a data packet sent in the network of FIG. 4.

Referring again to FIG. 4, links A-C and A-D could be one load sharing set and links B-C, B-D and B-E could represent a second load sharing set. As can be observed, if only one link of each of the load sharing sets is present in the network (together with each of the other links in the network), no redundant paths exist. FIGS. 4A and 4B illustrate two examples of the network of FIG. 4, with only one link present from each of the above two load sharing instances. Since no redundant paths remain, there is no need to identify any other load sharing sets. That at is, if only one link is used from each load sharing instance, there will be no loops or redundant communication paths in the network. Of course, a number of other possibilities could have been selected for load sharing sets. Indeed, it is also possible to "block" some links while doing load sharing (i.e., determine load sharing instances or sets) on other links.

Thus, the selection of load sharing instances identifies redundant communication paths. A mechanism for selecting which one of a redundant set of communication links may now be described. This can be done using the concept of forward masks. A forward mask is a unique label assigned to a link within a load sharing instance.

Referring again to FIG. 4 and using the load sharing instances identified above—{A-C, A-D} and {B-C, B-D, B-E}—link B-C may be assigned a forward mask of "X", link B-D may be assigned a forward mask of "Y", and link B-E may be assigned a forward mask of "Z". These three links constitute a load sharing instance, and each one has a unique forward mask. Similarly, link A-C may be assigned a load sharing mask of 0 and link A-D may be assigned a forward mask of 1. Of course, 0, 1 and 2 could have been used rather than X, Y and Z—the requirement is that the forwarding mask be unique, only within the load sharing instance.

Defining a communication network once forward masks have been assigned may be accomplished as follows. As explained above, with reference to FIG. 2A, the network needs to be effectively configured as a spanning tree for packets sent to an unknown destination address. Again, as described above, when a data packet is received, it need only be identified with, and forwarded to, exactly one unique forward mask from each load sharing instance.

The concept of forward masks can be illustrated with the examples shown in FIGS. 4A and 4B. In FIG. 4A, a data packet with an unknown destination address is affiliated with forward mask 1 of a first load sharing instance and forward mask X of a second load sharing instance. Since links 1 and X have been selected, links 0 (A-C), Y (B-D) and Z (B-E) are effectively removed from the network topology (as far as this data packet is concerned). Accordingly, the effective network topology for this data packet would appear as shown in FIG. 4A. As can be seen, the effective network topology is one with no loops, i.e., a spanning tree of the five bridging boards. Similarly, in FIG. 4B, a forward mask 0 is selected for the first load sharing instance and a forward mask Y is selected for the second load sharing instance. As can be seen, the network connections are different. Nevertheless, the new effective topology is still a spanning tree.

Figure 5:
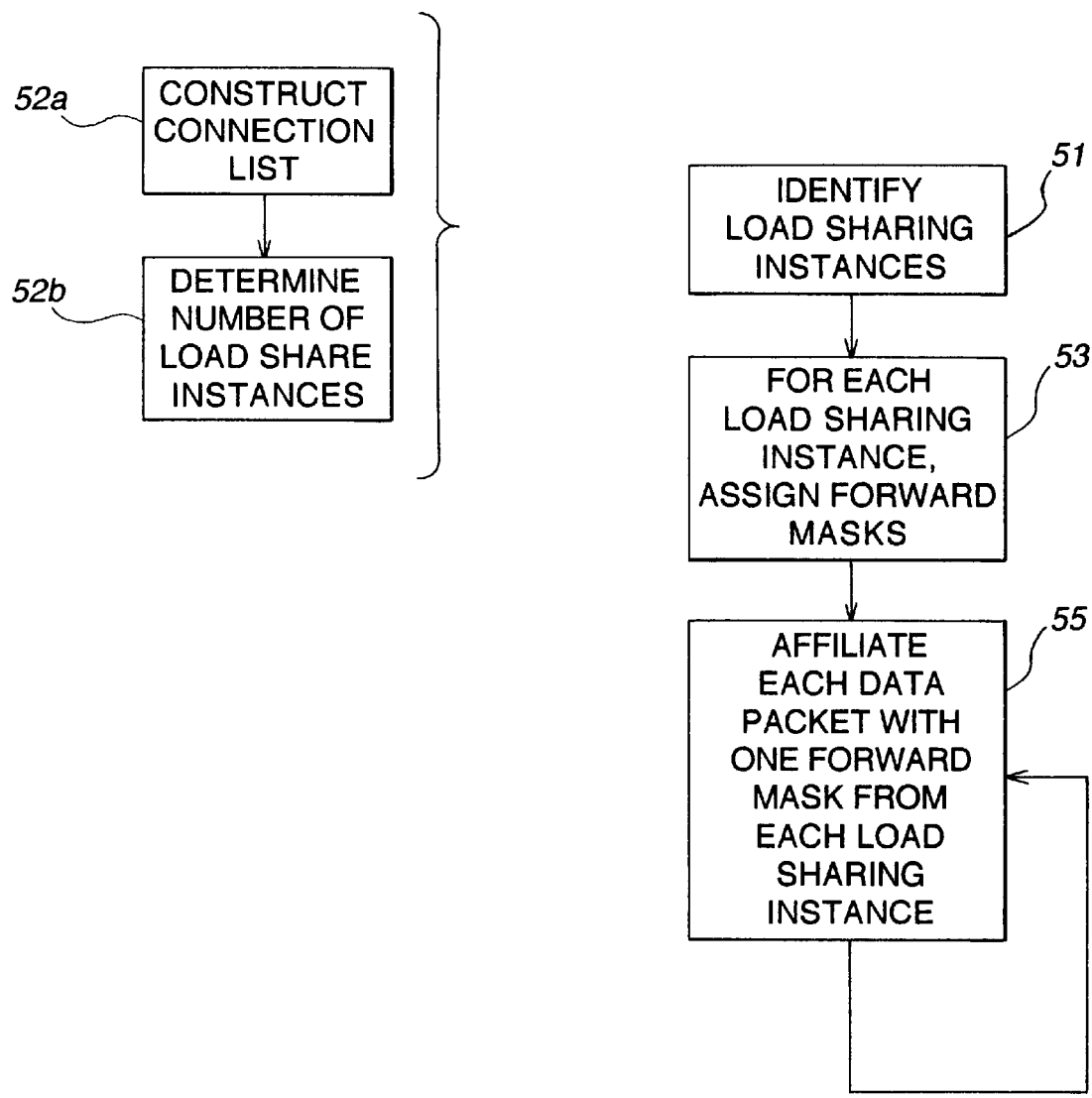
FIG. 5 illustrates one embodiment of a method for sharing communication load in a redundant communication network.

FIG. 5 illustrates, therefore, one embodiment of the present invention for distributing data communication over redundant links in a network. At a step 51, load sharing instances for the network are identified. At a step 53, for each load sharing instance, a unique forward mask is assigned to each link. At a step 55, when a data packet is received and the address destination for the data packet is not known, precisely one forward mask is selected for each load sharing instance. In this way, and as explained in connection with FIGS. 4, 4A and 4B, each data packet is broadcast over a spanning tree topology and the undesirable effects of packet duplication are avoided.

In a preferred embodiment, the determination of load sharing instances and assignment of foreign masks is done on a distributed basis, i.e., each bridging board determines for itself what load sharing instances it participates in and what the forward mask assignment will be for each of the board's ports (i.e., the ports corresponding to the links in the load sharing set). Of course it is preferred that each bridging board reach the same conclusion.

Determination of load sharing instances and forward masks may be done on a distributed basis to avoid the need for a central manager and the associated costs and overhead incurred when a central manager is used. In order for each bridging board to make a determination about load sharing instances, the bridging board must send and receive information regarding network topology to and from other bridging boards in the network.

In a preferred embodiment, information is exchanged between bridging boards only concerning the bridging boards connected immediately next to the bridging board, and those one step beyond that. Thus, in the network illustrated in FIG. 4, bridging board BA would receive information about the connections of bridging board BE (including link C-D), but not bridging board B-E. This streamlines implementation of the load sharing methodology, at the potential cost of being unable to identify all of the loops in a large network topology. Designs involving the gathering of more information could, of course, be readily implemented by one of skill in the art, based on the disclosure provided herein.

Figure 6A:
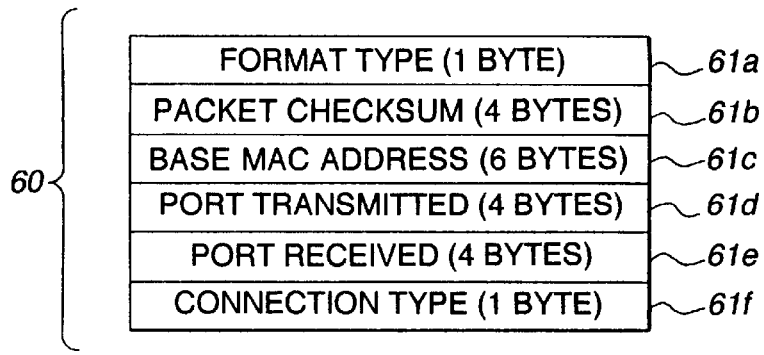
FIG. 6A illustrates a format for a load sharing packet.

FIG. 6A illustrates the format for a packet that can be used to communication information, concerning network topology, between bridging boards. The packet format 60 includes fields 61a to 61f. Field 61a indicates a format type for the packet—identifying this as a load sharing information packet. Field 61b includes error detection information to assist in determining whether any errors were introduced during communication of the packet. Field 61c is a media access control or MAC address. Field 61d identifies the port on which the packet was transmitted. Field 61e specifies the port that a packet was received on. Finally, field 61f identifies the type of connection associated with the link between the transmitting port(61d) and the receiving port (61e). The connection type identifies whether the particular link is available for load sharing. If the connection type byte has a value of 1, for example, the link is identified as a "network" link and is available for load sharing. If the value of the connection type byte is 2, the applicable link is identified as a "user" link—and this link will be prevented from being included in a load sharing instance. Thus, a system operator may selectively enable or disable load sharing for individual links off of a board. (In a preferred embodiment the system operator may also selectively enable or disable load sharing for an entire board.)

In a preferred embodiment, backplane buses in a network are always identified as user connections. This is done because the backplane cannot be used for selective sharing of load—the backplane transmits information to all of the boards in the applicable chassis. For a similar reason, two boards ("A" and "B") within a chassis should not be connected together. Communications to other boards in the same chassis is done via the backplane—meaning that the communication will always be sent from A to B (and other boards) on the backplane; an additional A-B connection is not useful.

To communicate network topology information between bridging boards, a packet of the general format illustrated in FIG. 6A is used. The packet includes information not only about the board immediately connected, but also each of its neighbors. Thus, the load sharing information packet is a variable length packet—the length of the packet depends on the number of neighbors that the applicable bridging board has.

Figure 6B:
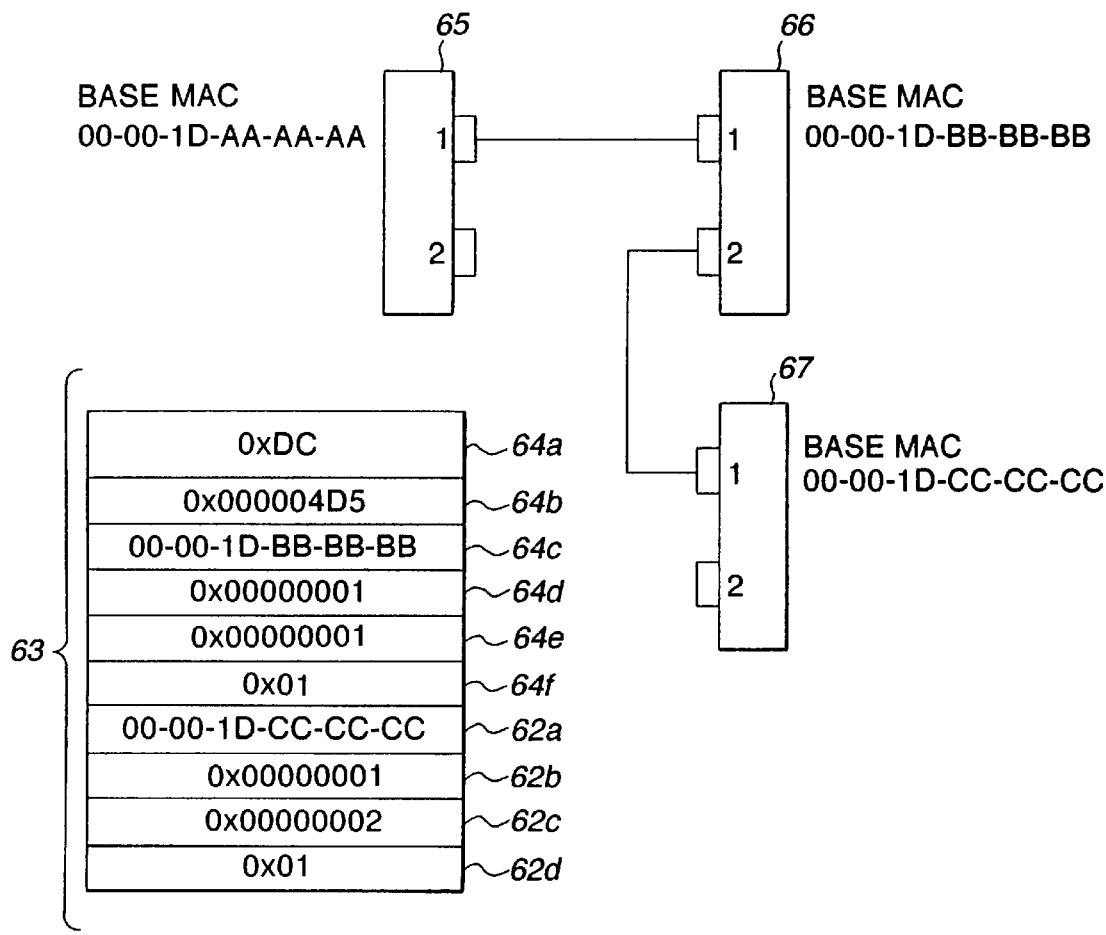
FIG. 6B illustrates an example of a network topology and a corresponding load sharing packet under this topology.

FIG. 6B illustrates an example of a load sharing information packet 63, for information being communicated from bridging board 66 to bridging board 65. As illustrated at 64a, the packet includes a format type specifying that this is a load sharing information packet. At 64b, a packet check sum is included. At 64c, bridging board 66 has identified its base MAC address. At field 64d, bridging board 66 identifies that this load sharing information packet is being transmitted off of its port identified as 1. At 64e, bridging board 66 indicates that the receiving port for this connection will be port number 1. (In fact, bridging board 66 may not know that bridging board 65 will receive the packet on its it port 1; nevertheless, this field may be included as a "place-holder" for construction of a connection list, described below.) Bridging board 66 further communicates information about each neighbor of bridging board 66—in this example, the only neighbor being bridging board 67. Thus, at 62a, bridging board 66 identifies the base MAC address for the adjacent bridging board 67. At field 62b, bridging board 66 identifies port 1 of bridging board 67 as having transmitted a load sharing information packet to bridging board 66. At 62c, bridging board 66 identifies that this packet was received from bridging board 67 on port 2 of bridging board 66. Finally, at 62d, bridging board 66 identifies this connection type as a network connection type.

Figure 7:
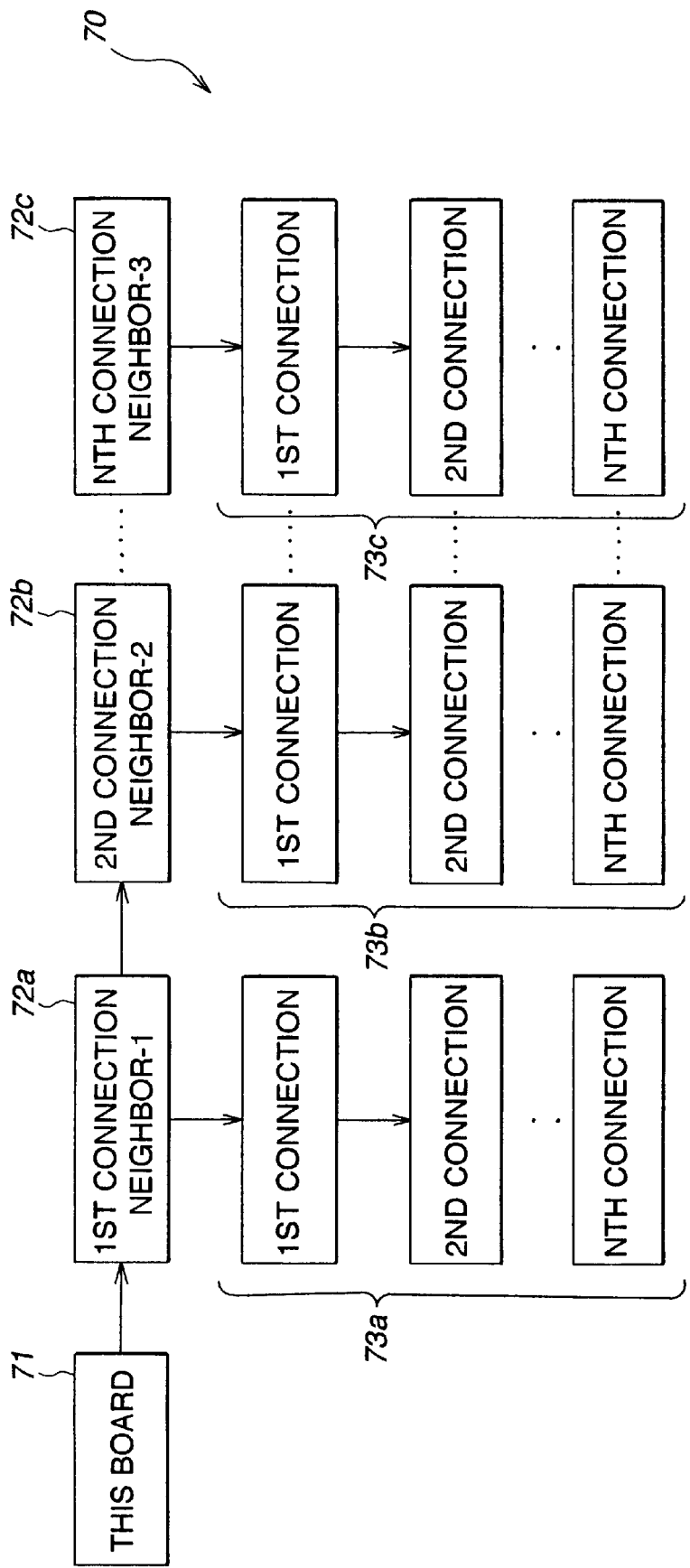
FIG. 7 illustrates a sample connection list data structure.

These load sharing information packets may be used to build a connection list data structure that represents the connections from the applicable bridging board and the connections from each of the neighbors of the bridging board. One such data structure is illustrated in FIG. 7. This data structure may be stored as a doubly linked list. The entrance 71 to the data structure 70 is an identifier for the bridging board that is storing this data structure. The data structure of FIG. 7 has N columns, one for each port on this board. Each column has a number of rows, after the first row, corresponding to the number of connections out of the board indicated at the top of the column. Thus, the first column 72a begins with a field for a first board that is immediately adjacent to this bridging board (i.e., connected by a link directly to this bridging board off of a first port). The first element of the second column 72b contains the information applicable to a second board directly connected to this bridging board (e.g., that lies off of a second port on this bridging board). In a preferred embodiment, the columns are organized in order of increasing MAC address. Each column further includes all of the connections that lie off of the board identified in the first row. Thus, there is an entry in the fields 73a for each connection off of the first board.

The connection list data structure can be readily understood through an example. FIG. 11A illustrates a sample network topology with bridging boards A, B, C, D and E and links A-C, A-D, B-C, B-D1, B-D2, C-D and D-E. Each link is labeled with an "N" for a network connection or a "U" for a user connection. It is assumed that bridging boards A-E are assigned MAC addresses in increasing order, i.e., A<B<C<D<E.

FIG. 11B illustrates a connection list CL, for the network topology of FIG. 11A. The connection list is built from the perspective of bridging board D, as indicated at 112. Bridging board D has a port connected to bridging board A, as indicated at 112a. Bridging board A itself has a link to bridging board C, as indicated at 112b. Similarly, bridging board A has a link to bridging board D (i.e., the link A-D), as indicated at 112c. In FIG. 11B, there are five columns in the connection list—one for each port on bridging board D. Each column has a number or rows, after the first row, corresponding to the number of connections out of the bridging board indicated at the top of the column. As shown in FIG. 11B, a bridging board may appear as more than one column in the connection list CL—when more than one link runs to that bridging board. The superscript "U" in the connection list CL indicates a user connection. For example, $B_1$ refers to the connection to B through link $B-D_1$, and $B^2$ refers to the connection to B through link B-D2.

Although FIG. 7 and FIG. 11B show small fields for each element of the connection list, an entire data structure can be stored at each element. This data structure may include not only the identity of the bridging board (by MAC address or otherwise) at that connection location, but also the transmit port, the receive port and the connection type.

Figure 8:
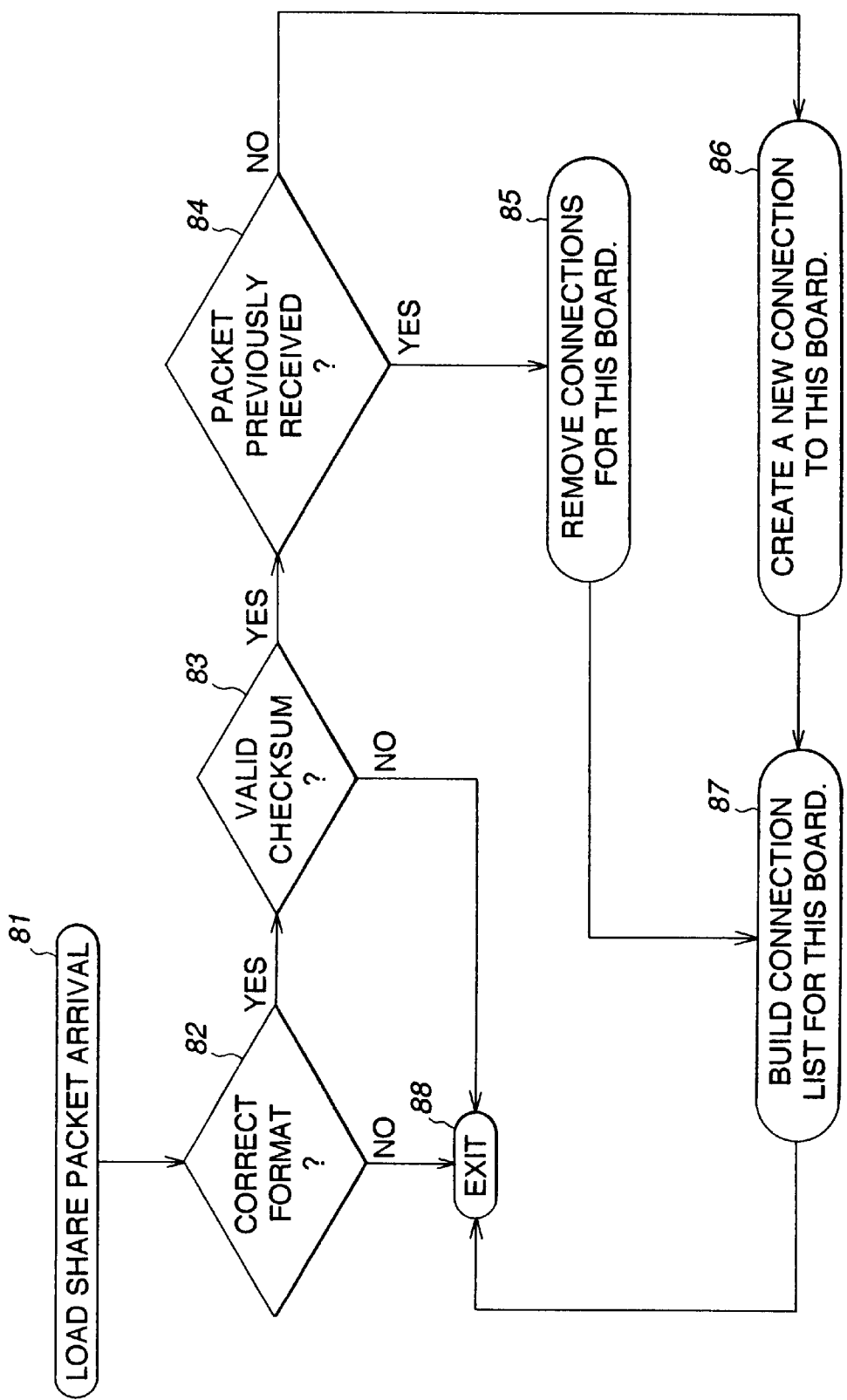
FIG. 8 illustrates one embodiment of a method to process a load sharing packet.

FIG. 8 illustrates the steps a bridging board may take when receiving a load share information packet such as the one illustrated in FIG. 6B. After the load share packet has arrived, at a step 81, the format is checked, at a step 82, to make sure that it is correct. If so, at a step 83, the check sum field 61b is examined to make sure that data errors are not present in the packet. If the packet is either not of the correct format or has an invalid check sum, processing terminates at a step 88. Assuming that the packet is of the correct format and that the check sum is valid, at a step 84, the connection list for this bridging board is examined to determine if a packet has been previously received on this port. If there is a connection in the first row of the connection list that was received on the same port, then a packet has been previously received. Otherwise, a packet has not yet been received for this port. If a packet has not yet been received on that port, at a step 86, a new column is created for the connection list, according to the structure of FIG. 7. If it is determined, at step 84, that the packet corresponds to a port that has previously received a packet, those connections are removed, at a step 85. Processing then continues, at step 87, where the connection list is updated by inserting the information from the new packet.

In this embodiment, each time a load sharing packet is received, the new packet information is placed into the connection list—even if all of the information in that packet is identical to an earlier received packet. Accordingly, the load sharing calculations, described in greater detail below, are made periodically—whether or not the connection list information has changed. Of course, a number of alternatives could be implemented, such as updating the calculations only when a substantive change is made to the connection list.

Referring again to FIG. 5, it can be seen that, after constructing a connection list at step 52a, as described above, processing may continue by determining the number of load share instances for the network at step 52b. The number of load share instances (or "load share count") roughly corresponds to the number of sets of links on which the load within the set of links will be independently shared on the network. In the particular embodiment described below, the number returned at step 52b may actually be greater than the number of sets of links on which load sharing will be conducted in the network. Load sharing instances identified at step 52b, but which do not actually correspond to redundant links on which load sharing may occur, are filtered out at step 53, as described in greater detail below.

Figure 9:
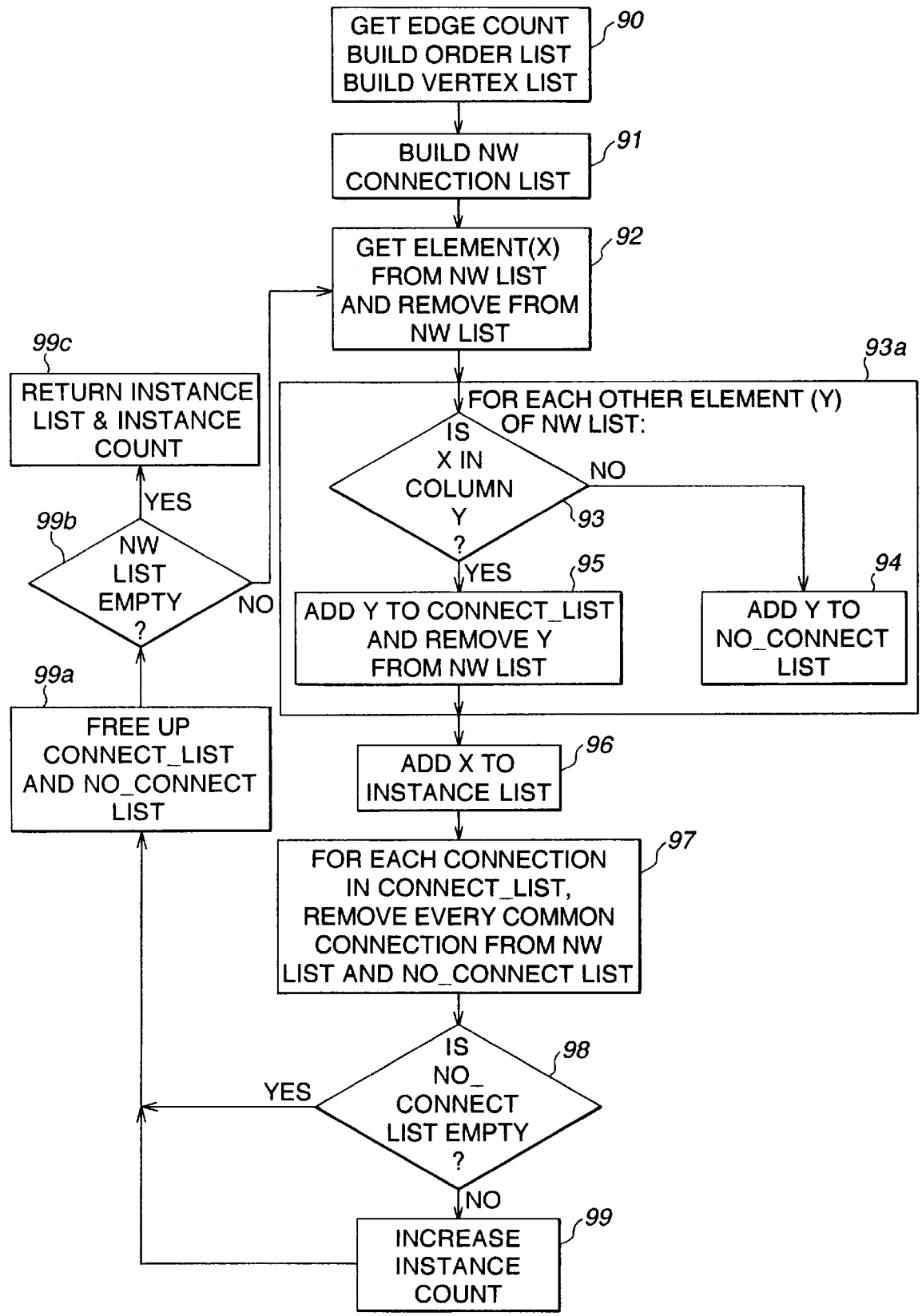
FIG. 9 illustrates a method of returning a load sharing instance count and a load sharing instance list.

FIG. 9 illustrates a method for determining a load share instance count and for returning a load share instance list. The method begins at a step 90, where an edge count is determined, an order list is built and a vertex list is built.

Figure 10:
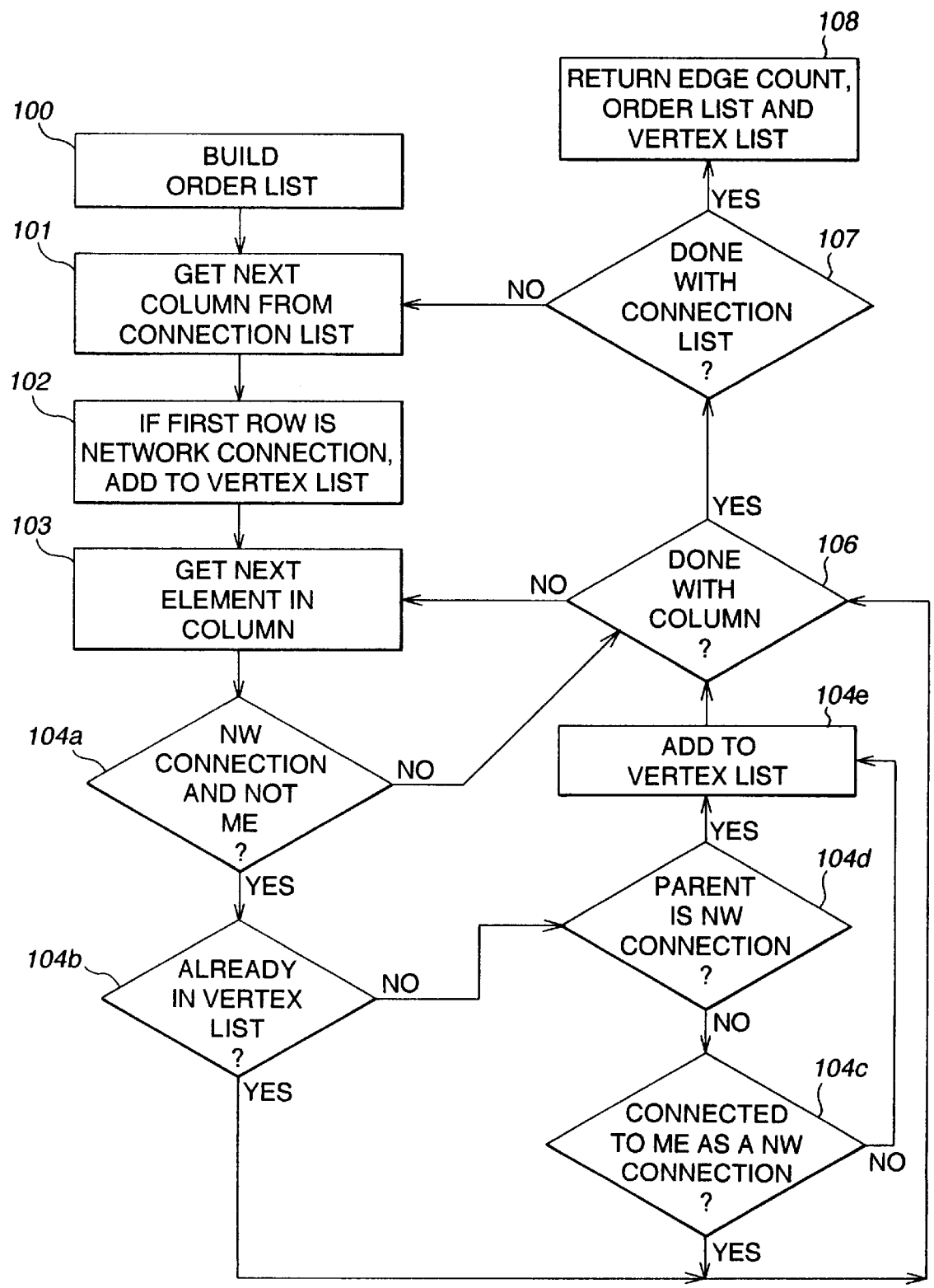
FIG. 10 illustrates a method of building an order list data structure, a vertex list data structure, and determining an edge count for a network topology.

FIG. 10 illustrates a method for producing the edge count, order list and vertex list. Processing begins at a step 100, where the order list is built. An order list is simply a list of all of the bridging boards (identified by and sorted in increasing order of, MAC addresses) of which this bridging board is aware via its connection list. Referring again to the network topology illustrated in FIG. 11A, a sample order list O is illustrated in FIG. 11D. The order list may be constructed by simply traversing the connection list CL, illustrated in FIG. 11B, and each time a new board is discovered, adding it to the order list.

After the order list has been built, processing continues, at steps 101 to 107, to produce a vertex list V. Processing begins at step 101 by taking the first column of the connection list. Referring to FIG. 11B, this would be the column at 112a, including elements 112a, 112b and 112c. At a step 102, the first row is examined to determine if this is a network connection. If it is, that bridging board, or "vertex," is added to the vertex list. Referring again to FIG. 11B, bridging board A is connected to bridging board D via a network connection—accordingly, vertex A is added to the vertex list.

A sample vertex list V for the network topology of FIG. 11A is illustrated in FIG. 11E. As can be seen in the vertex list V, the first element of the list includes an entry corresponding to bridging board A, identified according to the steps described immediately above.

The method continues, at a step 103, by examining the next element in the column—in the example of FIG. 11A, this would be element 112b which corresponds to bridging board C.

At steps 104a to 104e, the element is examined to determine whether it should also be added to the vertex list (step 104e). As can be seen from steps 104a to 104d, the bridging board/element is added to the vertex list if:

(a) the bridging board is attached via a network connection;
(b) the bridging board is not the bridging board stepping through this method;
(c) the bridging board is not already in the vertex list; and
(d) either
  (i) the first row element of the column for the bridging board is a network connection, or
  (ii) the bridging board is also connected directly to the bridging board stepping through this method via a network connection.

At step 106, each element in a column is examined until the column is exhausted.

Returning to our example, element 112b is examined beginning at step 104a. The A to C connection is a network connection, and the bridging board (C) is not the board stepping through this method (D)—accordingly processing continues at step 104b. C does not yet appear in the vertex list, accordingly processing proceeds at step 104d. The parent connection for C (element 112a) is a network connection. Accordingly, C gets added to the vertex list. This is illustrated, in FIG. 11E, as the second element (B) of the vertex list.

The next element in the column is retrieved, at step 103—which corresponds to element 112c. At a step 104a, it is determined that, although D is connected to C by a network connection, the applicable bridging board (D) is the board stepping through this method (D). Accordingly, it is not added to the vertex list.

Once a column is completed, processing continues at a step 107, until all of the columns have been examined.

FIG. 11E illustrates an original complete vertex list for the network topology of FIG. 11A, computed from the perspective of bridging board D. The order of elements illustrated in FIG. 11E is the order in which elements would be added to the vertex list, when stepping through the method illustrated in FIG. 10. A modified vertex list used later in this method, however, is sorted by order of increasing MAC address, i.e., {A, B, B, C, C, E}.

At a step 108, the edge count, order list and vertex list are returned. The edge count represents the number of network connections (i.e., excluding user edges) in the network topology, of which D is aware (e.g., represented in D's connection list, CL). The edge count is equal to the number of elements in the applicable vertex list. Thus, the edge count for bridging board D is 6—the number of elements in the vertex list.

Referring again to FIG. 9, steps 91 to 99C illustrate one method for using the edge count, order list, vertex list and connection list to determine a load share instance count and instance list.

At a step 91, a network connection list, or "NW list," is built. The NW list is simply a list of all of the bridging boards immediately attached to this bridging board by a network connection. A network connection list for the network topology of FIG. 11A is illustrated in FIG. 11C. The list simply includes {A, $B^1$, $B^2$, E}. As illustrated in FIG. 11C, each element of the network connection list may include a pointer to the remaining elements of the applicable connection list column, as shown at 113.

Processing then continues at a step 92, which entails selection of the next element from the NW list. For convenience, whichever element is selected at step 92 is referred to as "X". At a step 93a, each other element (referred to as "Y") of the network list is examined. For each element Y, the column in the connection list corresponding to that element is examined to see if the bridging board X is included in the column Y, at step 93. If it is not in column Y, Y is added to a "no_connect" list at step 94. If X does appear in column Y, Y is added to a "connect_list" and Y is also removed from the NW list at step 95.

Returning to the examples illustrated in FIGS. 11A to 11E, element A is first selected from the NW list at step 92. The next element of the NW list is a column having bridging board B in the first row. Since bridging board A does not appear anywhere in the column of board B, B is added to the no_connect list at step 94. The third column is then examined. Since this column is identical to the second column, B is again added to the no_connect list. Finally, the column beginning with bridging board E is examined. Again, bridging board A does not appear in this column and element E is added to the no_connect list. Thus, at completion of step 93a, the connect_list would be empty and the no_connect list would include {B, B, E}.

At a step 96, the original element is added to an instance list—in the example above element A would now be added to the instance list.

At a step 97, each element in the connect_list is examined. For each element in the connect_list and each element in that element's column in the connection list, any corresponding entry in the no_connect list, or in the network list, is removed from the respective list. In the present example, the connect list is empty and nothing is removed from the no_connect list or the network connection list, at step 97.

At a step 98, the no_connect list is examined and if the no_connect list is not empty the instance count is increased, at a step 99. If the no_connect list is empty, the instance count is not increased. In the above example, the instance count would now be increased to one. At a step 99a, the method begins to reset itself to process the next element on the network list, by freeing up (that is, clearing) any elements left in the connect_list and no_connect list. At a step 99b, if the network list is empty, processing is complete and the instance list and instance count are returned, at a step 99c. Otherwise, processing continues by returning to step 92.

To continue with the earlier example, the next element of the network connection list is the first appearance of bridging board $B^1$ in the connection list. When the $B^2$ column is examined, at a step 93, bridging board B is again identified. Accordingly, the second appearance of B is removed from the network connection list and B is added to the connect_list, at step 95. When the column beginning with bridging board E is examined, bridging board B is not found, and element E is added to the no_connect list (step 94). Thus, the connect list calculated at step 93a includes {B} and the no_connect list includes {E}. At step 96, element B is added to the instance list. At step 97, B (from the connect_list), and the connections from B (C and D), are not found in column E (from the no_connect list) or in the remaining connections of the network connection list. Accordingly, no action is taken at step 97. At step 98, it is determined that the no_connect list is not empty (it includes element E). Accordingly, at step 99, the load share instance count is increased (to 2).

At this point., the network list is still not empty (element E being the last element left in the network connection list). Element E is retrieved from the network connection list at step 92. Because there are no other columns in the network connection list, steps 93a to 97 result simply in E being placed in the no_connect list. The no_connect list is not empty, and accordingly the instance count is increased at step 99 (to 3). The network list is now empty. At step 99c, accordingly, the instance list (which includes elements {A, B, E}) is returned along with the instance count of 3.

Referring again to FIG. 5, after the load sharing instances have been identified, the forward masks need to be assigned for each load sharing instance (step 53).

If there is only one load sharing instance, this can be done directly using the vertex list and order list, as explained in more detail below in connection with FIGS. 13–14. If the load sharing instance count is greater than 1, however, the forward masks may be set up for each individual load sharing instance separately.

Figure 12:
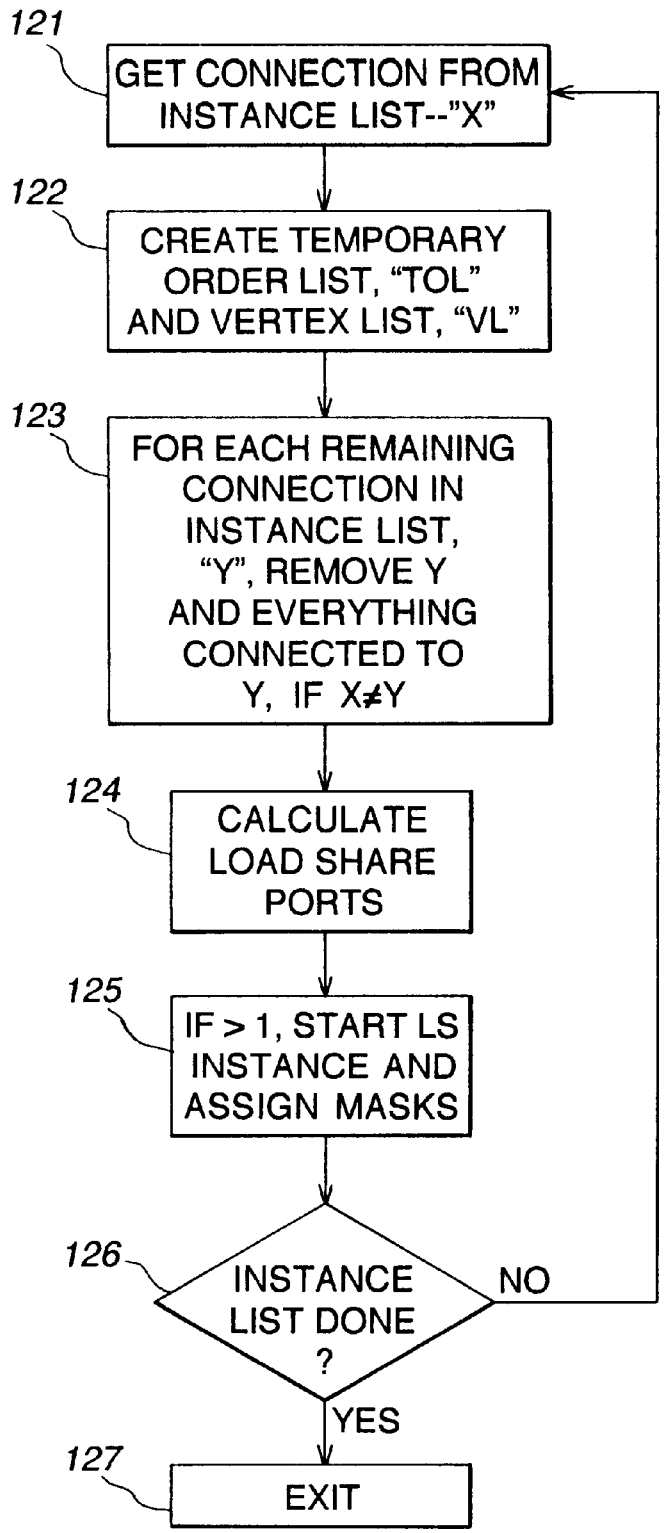
FIG. 12 illustrates a method for processing load sharing instances, when there is potentially more than one load sharing instance.

FIG. 12 illustrates a method of preparing to calculate forward masks for each load sharing instance, when there is potentially more than one instance. The method begins at a step 121 where the first connection on the instance list, referred to as "X", is selected. For this load sharing instance, a temporary order list and a temporary vertex list are created, at a step 122. The temporary order list and temporary vertex list, at this point, are identical to the order list and vertex list determined as described above. At a step 123, for each remaining element listed in the instance list, that element is removed from the temporary order list and from the temporary vertex list if that element is not equal to X.

Referring again to the example of FIGS. 11A to E, and again from the perspective of bridging board D, the instance list is {A, B, E}, as explained above. The first connection selected from the instance list would be element A. The temporary order list would include {A, B, C, D, E}, as shown at FIG. 11D. The temporary vertex list (sorted) would include {A, B, B, C, C, E}. At step 123, each of the remaining connections in the instance list, {B, E}, and each element connected to these (one occurrence of C and three occurrences of D (two from the B column and one from the E column)), are removed from the temporary order list and the vertex list. Accordingly, the temporary order list would be {A}. The temporary vertex list would be {A, C}.

At a step 124, a number of load share ports is calculated using the temporary order list and temporary vertex list determined at step 123. A method of calculating load share ports is described in greater detail below. At a step 125, if the number of load sharing ports is more than 1, a load sharing instance (in this context, load sharing instance refers to a program that monitors load sharing over the ports coupled to links in the applicable load sharing instance) is started and the forward masks are assigned to the ports participating in this load sharing instance. As indicated at steps 126 and 127, processing continues until each element of the instance list has been examined.

Figure 13:
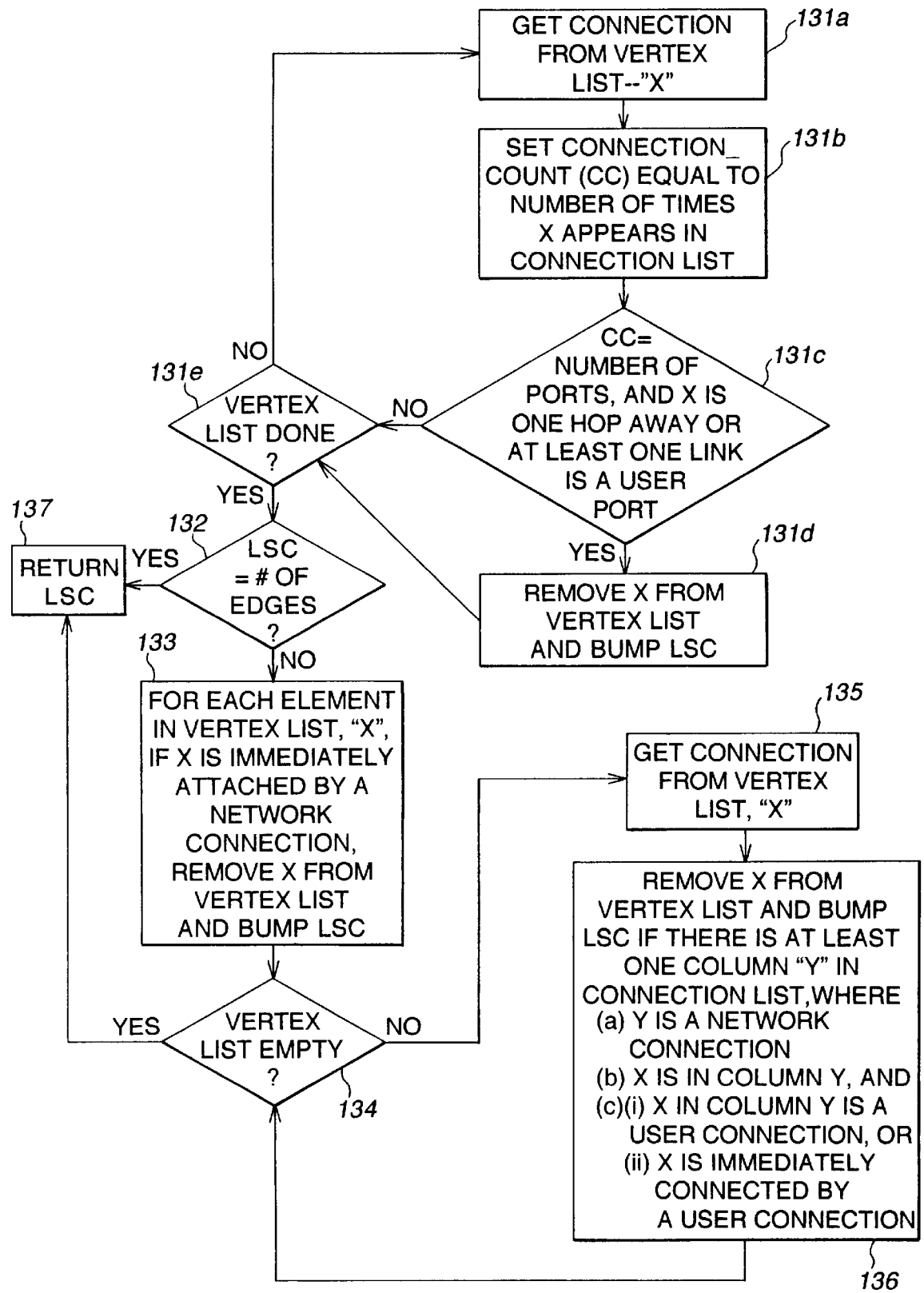
FIG. 13 illustrates a method of finding a load sharing count for a given vertex list.

FIG. 13 illustrates a method for calculating the total number of load share ports in a load sharing instance. The number of load share ports, or "load share count," is equal to the number of links or "edges" on which load sharing is occurring for this particular load share instance. Thus, a load share count of 2 refers to load sharing across two edges in a network.

Processing begins at a step 131a, where an element of a vertex list ("X") is selected. A variable referred to as the connection count or "CC" is then set equal to the number of times that the bridging board at element X appears in the connection list step 132b. In the example from FIGS. 11A to 11E, and from the perspective of bridging board D, the first element selected from the vertex list is A. Vertex A appears in the connection list for bridging board D exactly twice. Accordingly, CC is equal to 2. At a step 131c, if the connection count is equal to the total number of ports for this bridging board (for bridging board D, the total number of ports is 5) and the element at X is just one hop away (i.e., immediately connected to the bridging board) or at least one port is connected to a user connection off of bridging board D, then element X is removed from the vertex list and the load share count is increased by one, at a step 131d. Processing continues through the loop at steps 131a to 131e until the entire vertex list has been examined. In the present example, the connection count for A is 2 and the connection count for C is 4. Since neither of these has a connection count equal to the number of ports on D) (5), no element of the vertex list is removed and the load share count remains at 0.

At a step 132, if the load share count is equal to the total number of network links in the topology (the edge count determined in the manner described above), then the load share count is returned step 137. In the present example, the load share count is still 0 and the number of links is 6. Accordingly, processing continues at a step 133.

At step 133, each of the remaining elements in the vertex list is examined. If X is immediately attached to the bridging board executing this process, by a network connection, then X is removed from the vertex list and the load sharing count is increased by 1. In the present example, A is immediately connected to bridging board D via a network connection. Accordingly, A is removed from the vertex list and the load sharing count is increased to 1. Tile remaining element in the vertex list, C, is immediately attached to D, but by a user connection. Accordingly, C remains in the vertex list and processing continues at a step 134. Because the vertex list is not empty, control passes to a step 135.

At step 135, C is selected from the vertex list. At a step 136, the connection list is examined with reference to the element selected. The element X is removed from the vertex list and the load sharing count is increased if there is at least one column of the connection list "Y" that satisfies the following conditions:

(a) the column Y is connected to the bridging board by a network connection;

(b) the element X is connected to the column Y; and (c) either (i) the element X appears in the column Y as a user connection, or (ii) the element X is immediately connected to the bridging board executing this process by a user connection.

Returning to our example, bridging board C is selected from the vertex list. The above conditions (a) to (c) are satisfied for each of the first three columns in the connection list. For example, in the column beginning with a connection from bridging board D to bridging board A, (a) A is connected by a network connection to D, (b) C appears in this column, and (c) (ii) C is connected immediately to bridging board D by a user connection. Accordingly, C is removed from the vertex list and the load sharing count is increased to 2.

Control then returns to step 134. Because the vertex list is empty, the load sharing count (2) is returned at step 137.

Continuing with our example, the above method determined the load share count for the first load sharing instance. As may be recalled from the discussion above, in the current example and from the perspective of bridging board D, D has three potential load sharing instances—corresponding to the three elements of the instance list {A, B, E}. Potential instance A was processed as above, and a load sharing count of 2 was determined. The second potential load sharing instance would be processed as follows.

Referring again to FIG. 12, the next element of the instance list is selected at step 121—element B. A temporary order list and temporary vertex list are then created at step 122. As can be verified by stepping through steps 123 to 125, the temporary order list would constitute the single element {B}. The temporary vertex list would include: {B, B, C}.

Control is then passed to the procedure set forth in FIG. 13. The first connection from the vertex list is selected at step 131*a*. As in the preceding example, the loop 131*a* to 131*e* is stepped through without any elements being removed from the vertex list and without the load sharing count being increased. At step 133, the same element B remains at the head of the vertex list. Because it is immediately connected to bridging board B via a network connection, that element is removed from the vertex list and the load sharing count is increased to 1. Similarly, the second appearance of element B in the vertex list results in its removal and in the load share count being increased to 2. Because C is connected by a user connection, however, processing continues, through step 134, to step 135. As in the earlier example, C is selected as the only remaining element of the vertex list. At step 136, for the same reasons as in the earlier example, C is removed from the vertex list and the load share count is increased to 3. Accordingly, for the second load share instance in the network topology illustrated at FIG. 11A, and from the perspective of bridging board D, the load share count is 3.

Returning again to FIG. 12, there is one remaining element in the instance list—E. After processing at steps 122 to 124, the vertex list is simply {E}. The order list is also {E}. In the method illustrated in FIG. 13, the element E is retrieved at step 131*a* from the vertex list. The connection count is 1, which is not equal to the number of ports off of bridging board D (5). Accordingly, the method continues through steps 131*e* and 132 to arrive at step 133. At step 133, it is determined that element E is immediately connected to bridging board D via a network connection. Accordingly, element E is removed from the vertex list and the load share count is increased to 1. At step 134, it is determined that the vertex list is empty. Accordingly, the load share count of 1 is returned.

Because the load share count is only one, any load sharing would occur only over a single connection. That corresponds to a link for which there are no redundant connections—that is, all of the traffic to element E passes through the D-E link. Accordingly, at step 125, no load sharing instance is begun for this connection. Because this potential load sharing instance is not a true opportunity for load sharing, there is no need to assign a forward mask for this connection, and no need to start a load sharing instance.

Having determined the load sharing count for each load share instance, forward masks may be assigned for each port in a given load sharing instance. FIG. 14 illustrates a method of assigning forward masks for a load sharing instance.

The method begins at a step 148*a*, where the first element is retrieved from the order list for this instance. Assuming that there is an element to retrieve, processing continues at a step 141. At this step, the connection list for the applicable bridging board (the bridging board that is calculating the forward masks) gets the first connection from the connection list for the retrieved element from the order list—assuming that there is one. (There will be a connection if the element retrieved from the order list is immediately attached to the applicable bridging board.) If it is, at a step 147, processing is then passed to a step 142. If the element retrieved from the order list is not immediately connected to the applicable bridging board, there is no port connection to retrieve from the applicable element. Accordingly, the next element is retrieved from the order list and processing continues at step 140.

Assuming that the element, "X", retrieved from the order list is connected to the bridging board, and that a connection ("Y") has been retrieved, processing continues at a step 142. If Y is an address corresponding to the bridging board executing this method, the corresponding port is enabled and assigned the current forward mask step 143 (which begins at 0 and is incremented during the course of the method illustrated in FIG. 14). As shown at a step 144, if all the ports are assigned, processing is complete. Otherwise, the next port, a new "Y", is retrieved from the applicable column X and processing continues at step 147 as described earlier. If at step 142, the retrieved connection is not to the bridging board applying this method, processing continues at a step 146*a*. As shown in FIG. 14 at steps 146*a* to 146*c*, the current forward mask value is increased by 1 if this port is a network port and it has a MAC address that is less than the MAC address for the bridging board applying this method.

Figure 14:
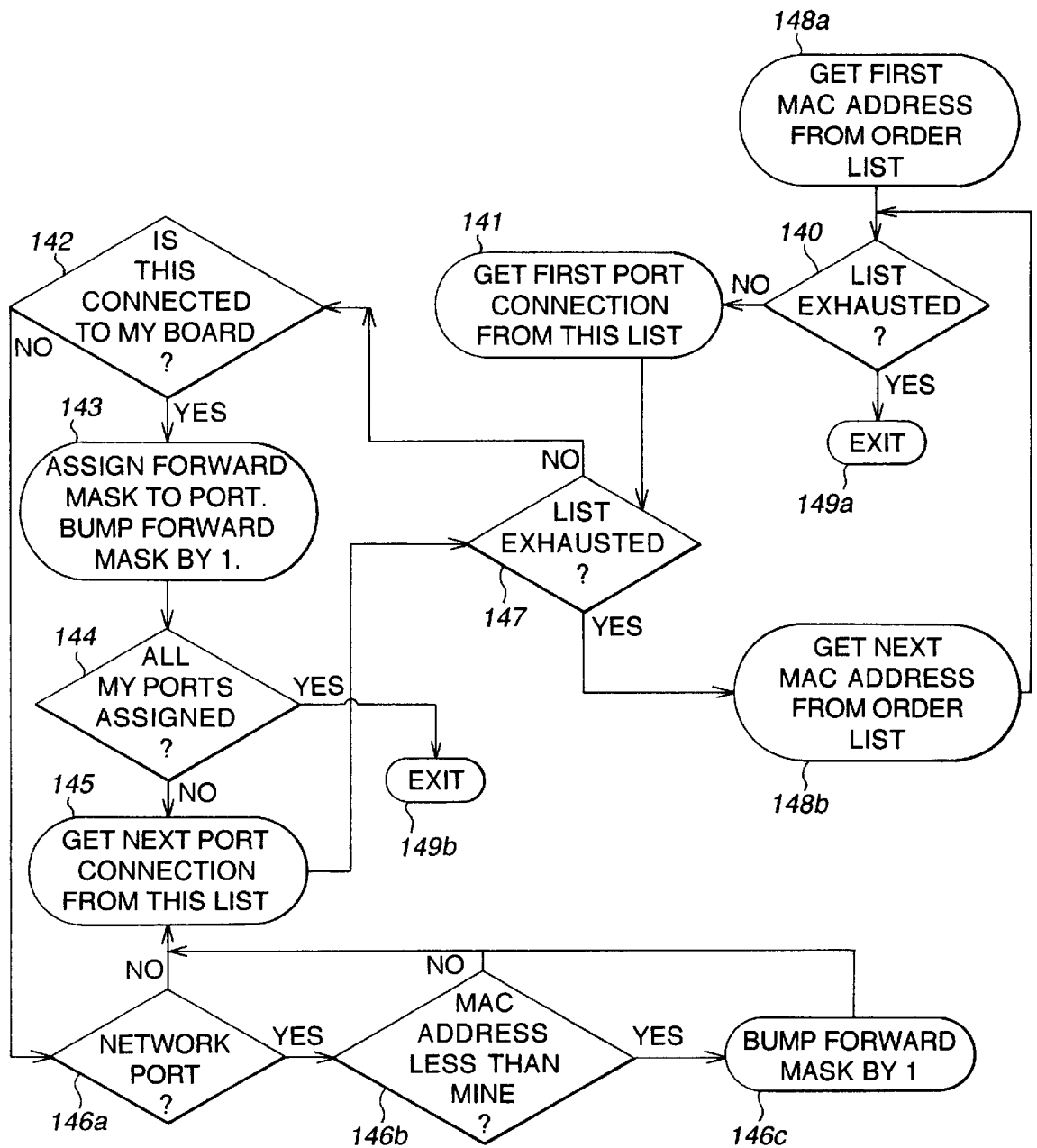
FIG. 14 illustrates a method of assigning forward masks to the ports of a bridging board.

Application of method of FIG. 14 can be illustrated by continuing with the example of FIGS. 11A to 11E, again from the perspective of bridging board D. As may be recalled, two load sharing instances were identified; one with a load share count of 2 and one with a load share count of 3.

For the first instance, and as described above, the order list includes only one element—{A}. This is retrieved at step 148*a* from the order list. As there is an element, processing continues at step 141. At step 141, it is found that A is immediately connected to bridging board D. Accordingly, the first port connection from bridging board A is retrieved—C on the connection list of FIG. 11B. As the list is not exhausted, at step 147, processing is forwarded to step 142. The connection, to C, is not to the applicable board, D. Accordingly, processing continues at step 146*a*. The connection is a network port (146*a*) and the MAC address for this connection (C) is less than the MAC address for the applicable board (D). Accordingly, the forward mask is incremented from 0 to 1 at step 146*c*. At step 145, the next port connection is retrieved from the connection list for element A. At step 142, it is determined that this element is connected to bridging board D by a network connection. Accordingly, the corresponding port is enabled and assigned a forward mask of 1. The current forward mask value is incremented to 2. All of bridging board D's ports are not assigned. Accordingly, processing continues at a step 145. All of the connections off of element A have been examined. Accordingly, at step 147, control is passed to step 148*b*. Since A was the only element in the order list, this list is similarly exhausted. Accordingly, the assignment of forward masks for this load sharing instance is complete, step 149*a*. Thus, for the first load sharing instance, bridging board D assigns a forward mask of 1 to the port corresponding to link A-D.

Referring to the second load sharing instance for the example of FIG. 11A to 11E, the temporary order list contains only the element B. This is retrieved from the order list at step 148*a*. At step 141, the first element from B's connection list column is retrieved—C. At step 142, it is determined that this is not connected to bridging board D. At step 146*a* it is determined that this is a network port. At step 146*b*, it is determined that the MAC address C is less than D's MAC address. Accordingly, at step 146*c*, the forward mask is increased from 0 to 1. The next port connection, retrieved at step 145, is a connection to bridging board D. This is connected to the applicable bridging board. Accordingly, at step 143, this port is enabled and assigned the current forward mask of 1. The forward mask is incremented to a value of 2. All of the ports are not assigned. Accordingly, the next port connection is retrieved from the list—the second connection to D. Processing continues as before and this port is both enabled and assigned the forward mask of 2. After this is complete, all of the connections to element B have been examined and all of the elements of the order list (which was only this one instance) have been examined. Accordingly, processing is complete and the forward masks have been assigned—the port for B-D1 is assigned a forward mask of 1 and the port for B-D2 is assigned a forward mask of 2. (To assure that bridging boards B and D reach the same conclusion on assignment of forward masks to the ports for B-D1 and B-D2, each board may select for first assignment of forward masks the lower port number on the station with the lower MAC address.)

Figure 15A:
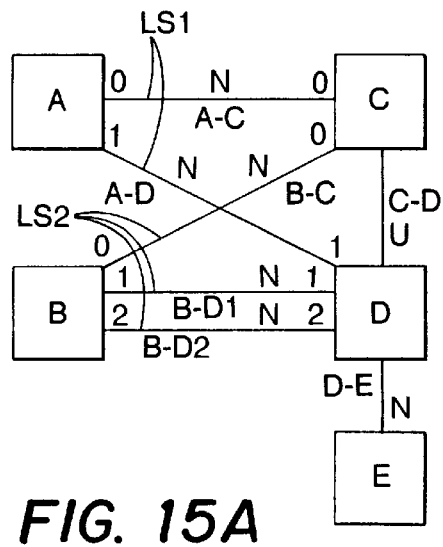
FIG. 15A illustrates one example of load sharing instances calculated for the network topology of FIG. 11A.

FIG. 15A illustrates the network topology of FIG. 11A, with forward masks assigned. Using the methods described above, each bridging board A, B, C, D and E can independently execute the method and arrive at the same conclusions as to forward masks and load sharing instances.

In FIG. 15A, there are two load sharing instances. The first load sharing instance LS1 has load sharing among links A-C and A-D. The second load sharing instance LS2 achieves load to sharing among links B-C, B-D1 and B-D2. Thus, bridging board A has one load sharing instance—with its ports having forward masks 0 and 1. Bridging board B also has one load sharing instance, with its ports being assigned forward masks 0, 1 and 2. Bridging board C has two load sharing instances. The first load sharing instance corresponds to load sharing between A-C and A-D, and the A-C link is assigned a forward mask of 0. The second load sharing instance is load sharing between links B-C, B-D1 and B-D2 and the B-C port also is assigned a forward mask of 0. Bridging board D also has two load sharing instances. As described above, the A-D port is assigned a forward mask of 1 for the first load sharing instance. The B-D1 and B-D2 ports are assigned forward masks of 1 and 2 respectively for the second load sharing instance. Finally, connections C-D and D-E do not load share. Thus, these links will bear all broadcast traffic in the network.

Referring again to FIG. 5, the above methods have described one embodiment for implementing step 51—identification of load sharing interests, and step 53—assignment of forward masks. The following discussion presents a method to achieve step 55, affiliation of each data packet with a unique forward mask from each load sharing instance.

Figure 16:
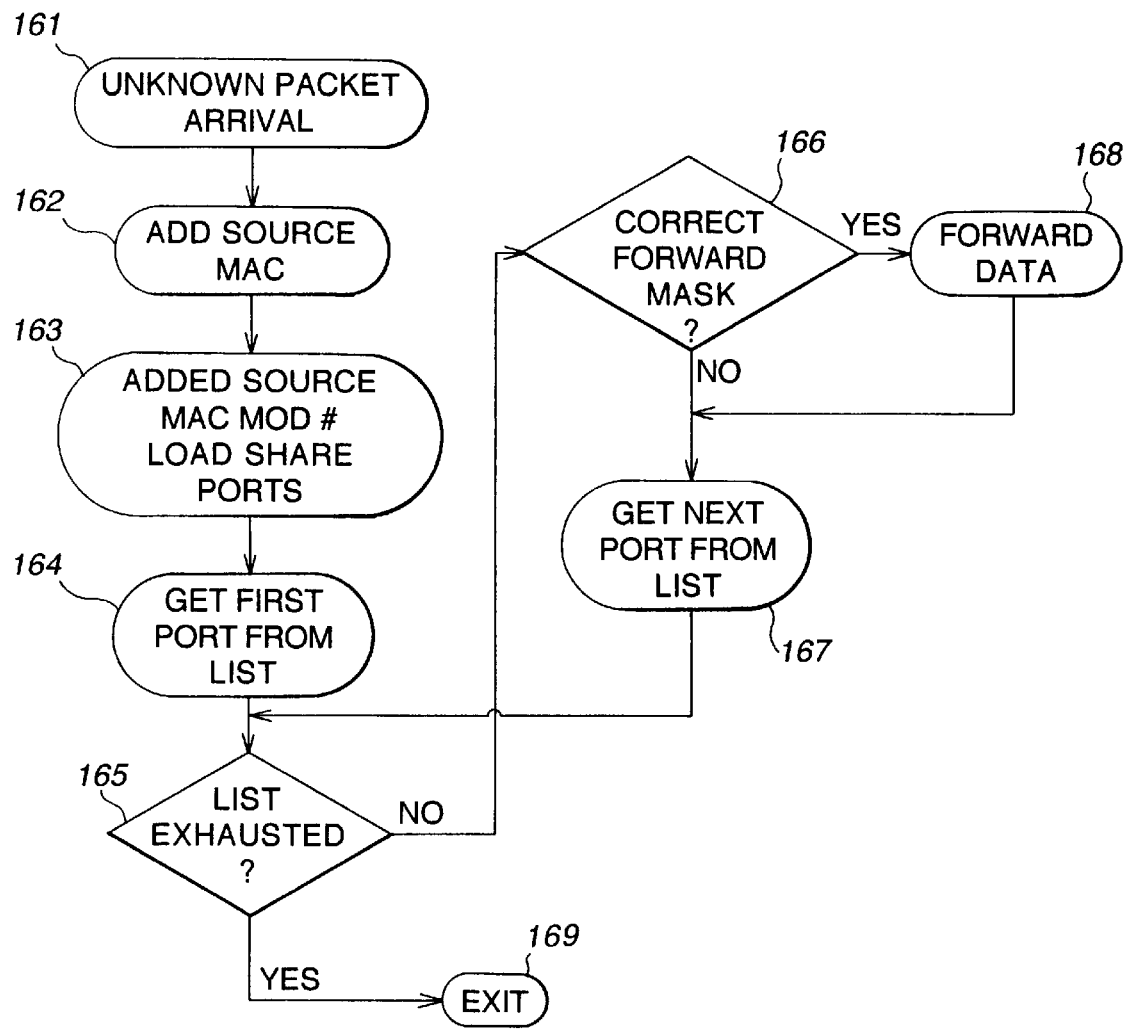
FIG. 16 illustrates a method for selectively determining which ports of a bridging board to forward a data packet upon.

One possibility is to use the source MAC address as a basis for assigning forward masks. This method is illustrated in FIG. 16. Of course a number of other methods of selection may be chosen, so long as each board reaches the same conclusion as to assignment of a forward mask.

The method begins, in FIG. 16, with the arrival of a packet with an unknown destination address, at a step 161. (The method may similarly be used for broadcast traffic.) At a step 162, the bytes of the source MAC address are added. At a step 163, this sum, MOD (or "MODULO"), the load share count for the applicable load share instance, is calculated. At steps 165 to 169, the data packet is forwarded only on a port that has a forward mask equal to the calculated amount.

Figure 15B:
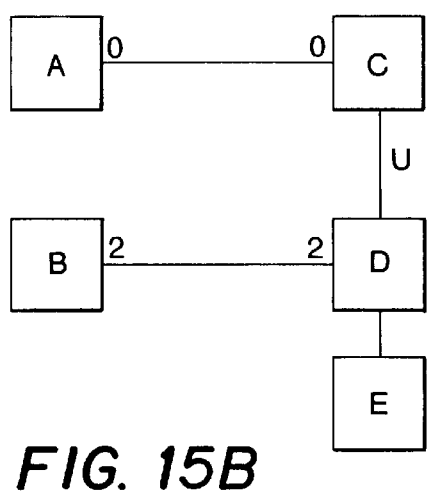
FIG. 15B illustrates a first effective network topology for a data packet, given the load sharing instances and forward mask assignments of FIG. 15A.

Returning to the example of FIG. 15A, consider the arrival of a packet with an unknown destination address whose bytes of the source MAC address add up to 2. For the first load sharing instance LS1 of FIG. 15A, the load share count is 2. 2 MOD 2 is calculated to be 0. Accordingly, the forward mask for the first load sharing instance is 0. The second load sharing instance LS2 has a load share count of 3. 2 MOD 3 is still 2. Accordingly, the forward mask for the second load sharing instance LS2 is 2. Thus, FIG. 15B illustrates the effective network for this packet. For load sharing instance 1, only the forward mask 0 is used. For the second load sharing instance LS2, only the connection with the forward mask of 2 is used.

Figure 15C:
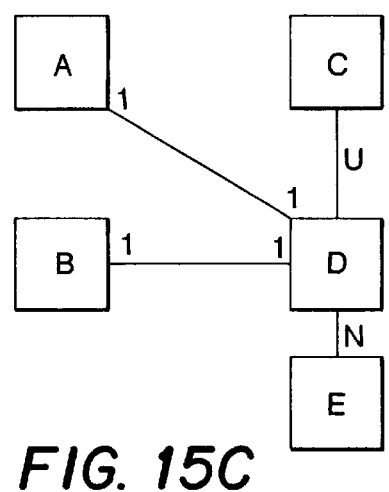
FIG. 15C illustrates a second effective network topology, given the load sharing instances and forward masks of FIG. 15A.

Similarly, consider a packet that arrives with an unknown destination address and a source address that adds up to 1. Using the method set forth in FIG. 16, the forward mask for both load sharing instances would be calculated to be 1. Accordingly, the effective network topology for this packet would be as illustrated in FIG. 15C.

Figure 15D:
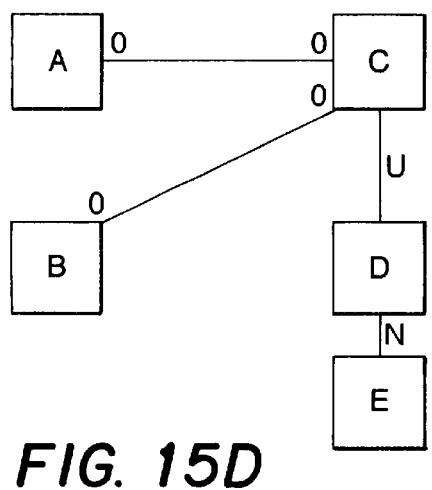
FIG. 15D illustrates a third example of an effective network topology for the load sharing instances and forward masks illustrated in FIG. 15A.

Finally, consider a packet with an unknown destination address that arrives having a source address that adds to 6. For the first load sharing instance LS1, 6 MOD 2 is 0. For the second load sharing instance LS2, 6 MOD 3 is 0. Accordingly, the forward mask for both load sharing instances LS1 and LS2 is 0. The effective network topology for this packet, therefore, is the one illustrated in FIG. 15D.

Having described one embodiment of the present invention, the management of changes of state in the network may now be described. When a port or a link in a network fails, if this connection corresponds to a link in a load sharing instance, reconfiguration is relatively straightforward. The load share count is decreased by 1, to reflect that one less link is participating in load sharing. If the load sharing count is now 1, no actual load sharing will occur. Accordingly, this load sharing instance may be terminated. Otherwise, the forward masks are simply reassigned on a similar basis to the one described above.

Similarly, if a bridging board fails, this can be treated as the failure of each of the links in the bridging board.

The exchange of load sharing packets described above provides an opportunity for simultaneously determining a change in status in the network. For example, in a preferred embodiment, load sharing packets are sent on each of a bridging board's ports every two seconds. If a packet is not received on a load sharing port within a predetermined amount of time, for example six seconds, the bridging board may assume that the communication link attached to that port has failed. Similarly, if a bridging board has not received any load sharing packet from another bridging board, that board may safely assume that the other bridging board has failed. Addition of a new communication link or a new bridging board is also relatively straightforward; when the new board is added, it will send new load sharing packets to each adjacent bridging board. The new information will automatically be assimilated into the network topology for each effected existing bridging board, using the methods described above.

The above methods of responding to changes of state in a network topology result in a significant improvement over simple application of the spanning tree. When a link goes down in the spanning tree, the entire tree may need to be restructured. Here, communication can continue unimpeded elsewhere in the network, and with only a small, localized delay in proximity to the failed link.

When a new port or new connection is configured into the network topology, the port is processed according to the methods described above, possibly resulting in the calculation of new load sharing instances and new forward masks.

The preferred embodiment described above only maintains information for bridging boards connected immediately to each bridging board, and boards one step further away. For this reason, the method may not detect load sharing possibilities for loops having four or more connections. In addition, loops of three or more network connections may result in anomalies in assignment of forward masks. Accordingly, the system operator should assure that at least one of the links in a loop of three is assigned as a user connection. (For this reason, any three chassis that are interconnected in the form of a three step loop should have at least one of those connections configured as a user connection.)

Of course, the above embodiment could be extended, and loops of three, four or more connections properly detected and handled by the exchange of additional information about network topology farther from each bridging board and/or suitable adjustments to the above embodiment. For example, one could exchange topology information sufficient to construct the complete network topology. One of a variety of different algorithms could then be chosen to assign load share instances and forward masks—either optimally through iteration of all possible configurations or using a heuristic in order to select load sharing instances and assign forward masks. Similarly a variety of different methods may be selected for assignment of unknown destination address data packets to a forward mask within the load sharing instance.

The load sharing method described above may be run stand alone or in combination with the spanning tree. Because the above embodiment may not detect some network loops having four or more steps, it is recommended that the above embodiment be used in combination with the spanning tree procedure.

To use the load sharing method in combination with the spanning tree, the load sharing instances sit "in between" the implementation of the spanning tree method and the bridging board. The load sharing method is performed as described above. Each link that is not a member of a load sharing set of redundant links is identified to the spanning tree algorithm, as is done and known in the prior art. In addition, each load sharing instance identifies precisely one link from its forward masks (e.g., every forward mask 0).

Figure 17:
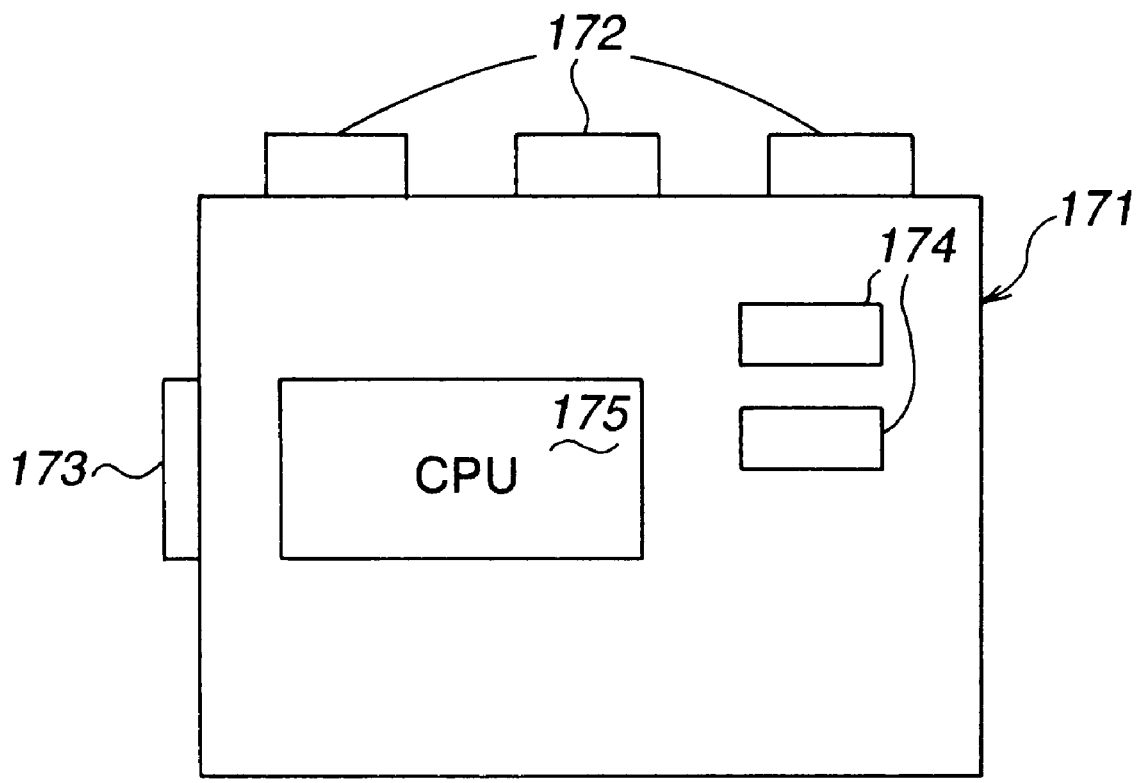
FIG. 17 illustrates one embodiment of a bridging board according to the present invention.

FIG. 17 illustrates a bridging board according to one embodiment of the invention. The bridging board 171 includes communication ports 172, and a command port 173. A central processing unit 175 is included in the bridging board, to control the function of the board. In a preferred embodiment, the central processing unit is an Intel 960 32-bit processing unit. Optionally, the bridging board may include additional hardware 174 for performing specific functions, such as implementing a BAF table or automatically forwarding certain communication packets without having to invoke a program on the CPU 175. Software programs may be downloaded to the CPU via port 172 or by any other suitable means. In addition, the function of the CPU and the configuration of the bridging board may also be controlled via command port 173. Thus, for example, load sharing may be enabled or disabled for the bridging board 171, using commands issued to the CPU 175 via the command port 173. Of course, many aspects of the previously defined inventions may be constructed as: software objects which may exist in embedded devices such as firmware; software objects which are part of an application on a general-purpose computer system; an application specific integrated circuit (ASIC); or other functionally equivalent mechanisms or hardware components.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of sharing communication load in a redundant computer communication network having a plurality of links, the communication load comprising transmission of a plurality of packets, the method comprising the steps of:

identifying at least one group of a plurality of the links in the network that are a part of a redundant communication path passing through a port on a bridge in the network, any one link in the group being sufficient to support the communication load in the network without any of the other links in the group;

transferring the communication load across the port;

sharing the communication load among the links in the group;

providing a packet containing information for transmission in the network;

forwarding the packet across at least one of the links on the network that is not identified as a member of one of the groups; and for each of the groups, forwarding the packet across only one of the links in the group.

2. The method of claim 1, wherein the step of identifying includes the step of identifying a plurality of such groups.

3. The method of claim 1, further comprising the steps of:

for each of the groups, assigning an identifier to each of the links in the group;

for the packet, determining a forward value to correspond to one of the assigned identifiers; and wherein during the step of forwarding the packet across only one of the links in the group, the packet is forwarded on the link having an assigned identifier corresponding to the forward value.

4. The method of claim 3, wherein the step of determining a forward value comprises the step of determining the forward value based on information in the packet.

5. The method of claim 4, wherein the step of determining a forward value comprises the step of determining the forward value based on a source address in the packet.

6. The method of claim 4, wherein the step of determining a forward value comprises the step of determining the forward value based on the number of links in the group and the information in the packet.

7. The method of claim 1, further comprising the steps of:

providing a first and a second bridging board;

transmitting network topology information from the first bridging board to the second bridging board;

transmitting network topology information from the second bridging board to the first bridging board;

each of the bridging boards separately identifying the at least one group of links in the network that are a part of the redundant communication path in the network; and each of the bridging boards separately determining whether and on what links to forward a received packet received by that bridging board.

8. The method of claim 7, wherein, for each of the bridging boards, the step of separately identifying is performed before the step of separately determining.

9. The method of claim 1, further comprising the steps of:

calculating a spanning tree among the links that are not in the identified groups and only one link from each identified group;

enabling communication on the links in the identified groups and on the links in the spanning tree; and blocking communication on the remaining links in the network.

10. The method of claim 1, further comprising a step of determining a spanning tree in the communication network, after the step of identifying.

11. A method of forwarding a packet received by a bridging board in a redundant network topology, the bridging board having a plurality of ports, the method comprising the steps of:

sending and receiving data about the topology of the network;

identifying at least one port of the bridging board that corresponds to a link in a first set of redundant links in the topology;

assigning a label to each identified port in the first set;

assigning a first forward value to the packet; and forwarding the packet to each identified port which corresponds to one of the links in the first set of redundant links only if the label for that port corresponds to the first forward value; and wherein the forwarding step includes a step of omitting forwarding the packet to any port of the bridge when the first forward value corresponds to a label assigned to a port on another bridge in the network.

12. The method of claim 11, further comprising the steps of:

identifying at least one port of the bridging board that corresponds to a link in a second set of redundant links in the topology;

assigning a label to each identified port in the second set;

assigning a second forward value to the packet; and forwarding the packet to each identified port which corresponds to one of the links in the second set of redundant links only if the label for that port corresponds to the second forward value.

13. The method of claim 11, wherein the steps of identifying and of assigning the label are performed before the step of assigning the first forward value.

14. The method of claim 11, wherein the step of assigning the first forward value comprises the step of determining the first forward value based on the information in the packet.

15. The method of claim 14, wherein the step of assigning the first forward value comprises the step of determining the first forward value based on a source address in the packet.

16. The method of claim 14, wherein the step of determining the first forward value comprises the step of determining the first forward value based on the number of links in the set and the information in the packet.

17. The method of claim 11, further comprising the steps of:

identifying one of the ports, that is not identified as corresponding to a link in the first set, as a part of a network running a spanning tree method for elimination of redundant paths; and determining whether a port that corresponds to a link in the first set should be identified as a part of the network running the spanning tree method.

18. A method of sharing communication load in a redundant network topology that includes a bridging board, comprising the steps of:

receiving a first packet on a port of the bridging board, the first packet having a destination address not known to the bridging board;

using a first effective network topology for transmission of the first packet;

receiving a second packet on the port, the second packet having a destination address not known to the bridging board; and using a second effective network topology for transmission of the second packet;

the step of using the second effective network topology being performed without reconfiguring active links in the redundant network topology.

19. A self-learning bridging board for a communication network having a network topology, comprising:

a plurality of communication ports;

means for detecting a first redundancy in the network topology, the first redundancy including at least one link coupled to one of the ports, referred to as the first redundant port;

means, coupled to the means for detecting and to the ports, for selectively forwarding a packet received on one of the communication ports, and having an unknown destination address, to the first redundant port; wherein the means for detecting comprises means for identifying at least one port of the bridging board that corresponds to a link in a first set of redundant links in the topology;

and the means for selectively forwarding comprises means for assigning a label to each identified port in the first set, means for assigning a first forward value to the packet, and means for forwarding the packet to each identified port in the first set only if the label for that port corresponds to the first forward value.

20. The bridging board of claim 19, further comprising:

means for identifying at least one port of the bridging board that corresponds to a link in a second set of redundant links in the topology;

means for assigning a label to each identified port in the second set;

means for assigning a second forward value to the packet; and means for forwarding the packet to each identified port in the second set only if the label for that port corresponds to the second forward value.

21. The bridging board of claim 19, wherein the means for assigning a first forward value includes means for determining the first forward value based on information in the packet.

22. The bridging board of claim 19, wherein the means for assigning a first forward value includes means for determining the first forward value based on the number of links in the first set and information in the packet.

23. The bridging board of claim 19, further comprising means for identifying one of the ports, that is not identified as corresponding to a link in the first set, as a part of a network running a spanning tree method for elimination of redundant paths; and means for determining whether a port that corresponds to a link in the first set should be identified as a part of the network running the spanning tree method.

* * * * *